(12) United States Patent
Keller et al.

(10) Patent No.: US 11,505,318 B2
(45) Date of Patent: Nov. 22, 2022

(54) CONTAINER RETENTION AND RELEASE APPARATUS HAVING INTEGRAL SWAYBRACE AND RETENTION FEATURES

(71) Applicant: The Boeing Company, Chicago, IL (US)

(72) Inventors: Cory Gordon Keller, St. Charles, MO (US); James V. Eveker, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 16/439,338

(22) Filed: Jun. 12, 2019

(65) Prior Publication Data
US 2020/0391866 A1    Dec. 17, 2020

(51) Int. Cl.
*B64D 1/04* (2006.01)

(52) U.S. Cl.
CPC ...................... *B64D 1/04* (2013.01)

(58) Field of Classification Search
CPC ... B64D 1/04; B64D 1/06; B64D 1/02; B64D 1/12; B64C 2201/121; B64C 2201/128
See application file for complete search history.

(56) References Cited

U.S. PATENT DOCUMENTS

| | | | | |
|---|---|---|---|---|
| 2,386,680 A | * | 10/1945 | Grotke | B64D 1/06 89/1.54 |
| 2,413,635 A | * | 12/1946 | Lee | B64D 1/04 89/1.58 |
| 2,478,019 A | * | 8/1949 | Sonntag | B64D 1/02 410/68 |
| 2,877,688 A | * | 3/1959 | Markil | F42B 8/22 89/1.58 |
| 2,941,442 A | * | 6/1960 | Buschers | B64D 1/04 89/1.51 |
| 2,978,211 A | * | 4/1961 | Wannlund | B64D 1/02 244/138 A |

(Continued)

FOREIGN PATENT DOCUMENTS

GB     784053     10/1957

OTHER PUBLICATIONS

United States Patent and Trademark Office, "Non-Final Office Action", issued in connection with U.S. Appl. No. 16/200,267 dated Dec. 22, 2021, 21 pages.

(Continued)

*Primary Examiner* — Christopher D Hutchens
(74) *Attorney, Agent, or Firm* — Hanley, Flight & Zimmerman, LLC

(57) ABSTRACT

Container retention and release apparatus are disclosed. An example container retention and release apparatus includes an actuator and a swaybrace and retention assembly pivotally coupled to the actuator. The swaybrace and retention assembly is to pivot relative to the actuator between a first position to retain a container and a second position to release the container. The swaybrace and retention assembly includes a swaybrace arm having a receptacle to engage a post of a container. The swaybrace arm to pivot between the first position to cause the receptacle to engage the post of the container to retain the container and the second position to cause the receptacle to disengage the post to release the container.

18 Claims, 19 Drawing Sheets

(56) References Cited

U.S. PATENT DOCUMENTS

| | | | |
|---|---|---|---|
| 3,181,908 A | | 5/1965 | Clark |
| 3,242,808 A | * | 3/1966 | Nelson .................... B64D 1/04 89/1.51 |
| 3,268,188 A | * | 8/1966 | Righter ................... B64D 1/06 244/118.1 |
| 3,367,233 A | * | 2/1968 | Silverschotz ............ F42D 3/00 89/1.51 |
| 3,670,620 A | * | 6/1972 | Paraskewik .............. B64D 1/04 89/1.53 |
| 3,787,012 A | | 1/1974 | Jakubowski, Jr. |
| 3,877,343 A | * | 4/1975 | Newell ..................... F41F 5/00 89/1.51 |
| 3,887,150 A | | 6/1975 | Jakubowski, Jr. |
| 4,120,232 A | * | 10/1978 | Hoffman, Jr. ........... B64D 1/06 244/137.4 |
| 4,122,754 A | | 10/1978 | Panlaqui et al. |
| 4,132,147 A | | 1/1979 | Contaldo |
| 4,168,047 A | | 9/1979 | Hasquenoph et al. |
| 4,187,760 A | | 2/1980 | Holt |
| 4,196,879 A | | 4/1980 | Craigie |
| 4,202,576 A | | 5/1980 | Hasquenoph et al. |
| 4,204,456 A | | 5/1980 | Ward |
| 4,257,639 A | | 3/1981 | Stock |
| 4,318,561 A | | 3/1982 | Hasquenoph et al. |
| 4,407,180 A | | 10/1983 | Regnat |
| 4,441,674 A | | 4/1984 | Holtrop |
| 4,620,680 A | | 11/1986 | Hasquenoph et al. |
| 4,732,074 A | | 3/1988 | Normand |
| 4,850,533 A | | 7/1989 | Hoshi et al. |
| 4,850,553 A | * | 7/1989 | Takata ..................... B64D 1/06 244/137.4 |
| 5,335,881 A | | 8/1994 | Zaguli |
| 5,406,876 A | | 4/1995 | Harless et al. |
| 5,484,243 A | | 1/1996 | Yacobovitch |
| 5,904,323 A | | 5/1999 | Jakubowski, Jr. et al. |
| 6,811,123 B1 | | 11/2004 | Foster et al. |
| 7,083,148 B2 | | 8/2006 | Bajuyo et al. |
| 7,648,104 B1 | | 1/2010 | Jakubowski, Jr. et al. |
| 7,677,501 B1 | | 3/2010 | Hundley et al. |
| 7,946,208 B1 | * | 5/2011 | Howard ................... B64D 1/04 89/1.57 |
| 10,336,543 B1 | * | 7/2019 | Sills ......................... B64D 1/22 |
| 10,518,883 B2 | | 12/2019 | Lewendon |
| 10,858,102 B2 | | 12/2020 | Keller et al. |
| 2006/0006288 A1 | | 1/2006 | Jakubowski et al. |
| 2006/0108478 A1 | | 5/2006 | Bajuyo et al. |
| 2017/0197716 A1 | * | 7/2017 | Taylor ..................... B64D 1/02 |
| 2018/0281952 A1 | | 10/2018 | Lewendon |
| 2019/0200534 A1 | * | 7/2019 | Hawkins ................. A01G 3/085 |
| 2020/0164982 A1 | | 5/2020 | Keller et al. |
| 2020/0164983 A1 | | 5/2020 | Keller et al. |
| 2020/0164984 A1 | | 5/2020 | Keller et al. |
| 2021/0163126 A1 | * | 6/2021 | Gray ........................ B64C 1/22 |

OTHER PUBLICATIONS

United States Patent and Trademark Office, "Notice of Allowance and Fee(s) Due", issued in connection with U.S. Appl. No. 16/200,238 dated Jan. 12, 2022, 7 pages.

United States Patent and Trademark Office, "Non-final Office Action", issued in connection with U.S. Appl. No. 16/200,211 dated Jan. 2, 2020, 6 pages.

United States Patent and Trademark Office "Notice of Allowance and Fee(s) Due", issued in connection with U.S. Appl. No. 16/200,211 dated Aug. 5, 2020, 5 pages.

United States Patent and Trademark Office, "Requirement for Restriction and/or Election", issued in connection with U.S. Appl. No. 16/200,267 dated Jun. 11, 2021, 10 pages.

United States Patent and Trademark Office, "Non-Final Office Action", issued in connection with U.S. Appl. No. 16/200,238 dated Jul. 7, 2021. 11 pages.

United States Patent and Trademark Office, "Ex Parte Quayle Action" issued in connection with U.S. Appl. No. 16/200,211 dated May 12, 2020, 5 pages.

United States Patent and Trademark Office, "Notice of Allowance and Fee(s) Due", issued in connection with U.S. Appl. No. 16/200,267 dated Aug. 10, 2022, 6 pages.

United States Patent and Trademark Office, "Final Office Action", issued in connection with U.S. Appl. No. 16/200,267 dated Jun. 21, 2022, 11 pages.

\* cited by examiner

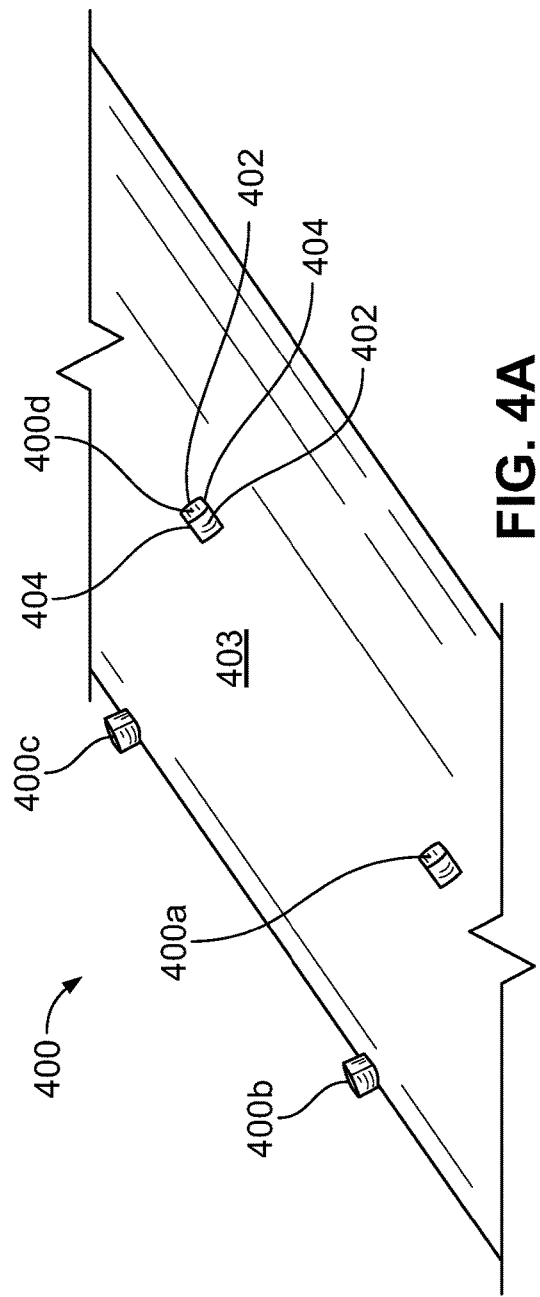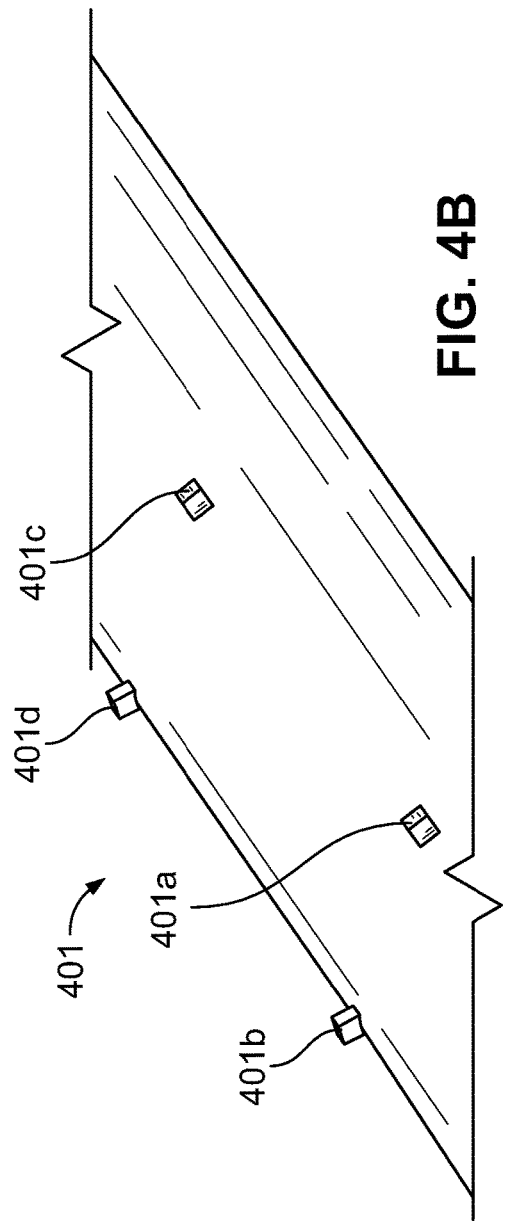

CONTAINER RETENTION AND RELEASE APPARATUS HAVING INTEGRAL SWAYBRACE AND RETENTION FEATURES

FIELD OF THE DISCLOSURE

This disclosure relates generally to aircraft and, more particularly, to container retention and release apparatus having integral swaybrace and retention features.

BACKGROUND

When suspending disposable containers (e.g., a weapon, a payload, a cargo container, etc.) from aircraft, it is desirable to provide suitable chocks or swaybraces to steady the container while carrying the container in flight to the point at which the container is released. Military aircraft that are used to dispense bombs, rockets, and other stores in flight usually include racks located beneath the wings and/or fuselage, or in weapon bays designed to release the stores upon command. Commercial aircraft that are used to dispense containers in flight usually include a retention and/or release system located beneath the fuselage (e.g., a belly of the fuselage).

SUMMARY

In some examples, a container retention and release apparatus includes an actuator and a swaybrace and retention assembly pivotally coupled to the actuator. The swaybrace and retention assembly is to pivot relative to the actuator between a first position to retain a container and a second position to release the container. The swaybrace and retention assembly includes a swaybrace arm having a receptacle to engage a post of a container. The swaybrace arm is to pivot between the first position to cause the receptacle to engage the post of the container to retain the container and the second position to cause the receptacle to disengage the post to release the container.

In some examples, a container retention and release apparatus includes a first ejector assembly including: a first cylinder; a first piston movably coupled to the first cylinder; and a first swaybrace coupled to a first end of the first piston. The first swaybrace has a first arm pivotally coupled relative to the first piston and a second arm pivotally coupled relative to the first piston. The first arm includes at least one of a first receptacle to interface with a first post of a container or a first retainer to interface with a first opening of the container, and the second arm including at least one of a second receptacle to interface with a second post of the container or a second retainer to interface with a second opening of the container.

In some examples, a method to improve retention and deployment of a container, the method including: moving an actuator between a first stroke position and a second stroke position; and releasing the container by pivoting a swaybrace relative to the container to remove at least one of a first receptacle from a post of a container or a first retainer pin from a first opening of the container.

BRIEF DESCRIPTION OF THE DRAWINGS

FIGS. 4A and 4B are partial, perspective views of other example containers disclosed herein.

Figure 1:
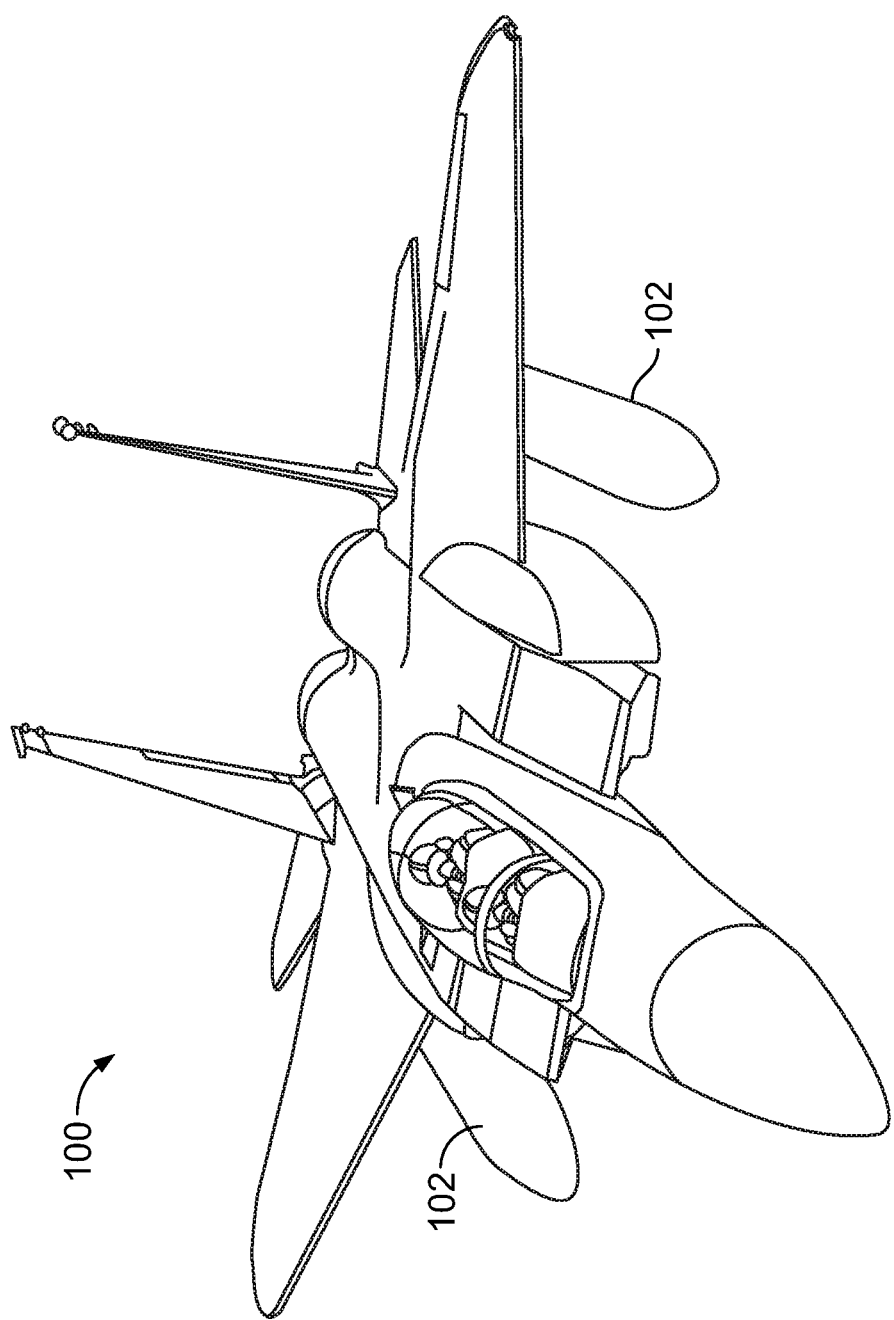
FIG. 1 is a perspective view of an example aircraft that can be implemented with an example container retention and release apparatus disclosed herein.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts. Additionally, several examples have been described throughout this specification. Any features from any example can be included with, a replacement for, or otherwise combined with other features from other examples.

DETAILED DESCRIPTION

Containers (e.g., stores, weapons, missiles, etc.) can be attached to and released from an aircraft. Containers can be used to carry munitions or other material (e.g., bombs, rockets, missiles, rations, etc.) to be dropped from the aircraft upon command. To carry and dispense containers upon command, aircraft often employ container retention and release apparatus (e.g., bomb racks) located beneath the wings and/or fuselage.

However, when coupled beneath the wings and/or fuselage, containers (e.g., missiles) can be exposed to many sources of mechanical vibration that can affect system reliability, safety, and mission effectiveness. One of the most significant exposures to vibration occurs when a missile is being carried by an aircraft (e.g., a military aircraft, a helicopter) or other aviation platform, which is a condition known as captive carry.

Some known container ejector apparatus employ hooks and/or other retention apparatus to hold the container in captive carry flight. To this end, additional structural contact points within the container are often needed for swaybraces and/or retainers to constrain the container in captive carry flight. For example, the containers typically include protruding lugs, hangers, and/or other fasteners that provide the container attachment points which couple with the swaybraces and/or other retainers to constrain the container. However, the protruding lugs, hangers, and/or other retention contact points result in aerodynamic drag on the container (e.g., a missile) after release of the container from the host aircraft while in free flight of the container that reduces container or weapon performance (e.g., a flight range of a missile). The separate lugs/hangers and/or swaybrace contact points add structural weight to the container and reduce available volume for payload within the container. To engage a hook mechanism of a conventional container retention and release apparatus, a container is accurately positioned or aligned (e.g., vertically) relative to the container retention and release apparatus. Some containers (e.g., weapons) include foldable lugs to mitigate the aerodynamic and/or detectability penalty due to protruding lugs or hangers. However, the use of foldable lugs results in loss of internal volume in a container, increased weight of the container, increased difficulty of loading the container on an aircraft, and/or can cause additional difficulties for a container loading crew. Additionally, most conventional container retention and release apparatus do not control roll and/or yaw of a container during ejection of the container. Some known container ejector apparatus incorporate a constrained container release system that reduces container yaw during ejection.

Example container retention and release apparatus (e.g., a bomb rack) disclosed herein retain and release a captively carried container in-flight. To retain and release a container, example container retention and release apparatus disclosed herein employ an example retention apparatus (e.g., a claw). In some examples, the retention apparatus matably engages an external interface (e.g., a post) of a container. For example, example retention apparatus (e.g., a bomb rack) disclosed herein interfaces with one or more lugs, pins, posts or other protrusions of a container external to an outer mold line (OML) of the store or container. Specifically, example container retention and release apparatus disclosed herein reduce a size of a lug or post (e.g., a pin, a hanger) compared to known protruding lugs, hangers and/or attach points. In this manner, the container retention and release apparatus disclosed herein improve aerodynamic characteristics (e.g., a smooth outer surface), thereby improving a range of the container and/or reducing detectability of the container by radar. Additionally, the lugs or posts disclosed herein do not protrude into the container to accommodate rocket motors and are now part of the container body instead of the ejector rack. In some examples, container retention and release apparatus disclosed herein can be employed with rail-type launch systems. In some examples, the retention apparatus contacts the container only at the swaybrace contact points, thereby eliminating the need for additional frames in the container for lugs or posts, which reduces container weight and increases internal volume available for payload. Further, the container retention and release apparatus disclosed herein are extendable to facilitate loading of a container with the retention apparatus. In some examples, example retention apparatus disclosed herein can be manually extended to aid with positioning a container during a loading operation.

In some examples, container retention and release apparatus disclosed herein allow a container to roll in a roll direction (e.g., by less than 9 degrees in the roll direction) during ejection. In some examples, the container retention and release apparatus disclosed herein fully constrain a container in a roll direction, a yaw direction and a pitch axis during ejection, which reduces (e.g., minimizes) space required for both internally and externally carried weapons and/or a dimension (e.g., a height) of example container retention and release apparatus disclosed herein.

In some examples, a retention apparatus disclosed herein includes an integral retention device and swaybrace assembly. In some examples, an example retention device and swaybrace assembly includes one or more retention apertures coupled to one or more swaybrace arms. In some examples, to retain and/or release a container, the retention apparatus (e.g., a swaybrace of the retention apparatus) pivotally couples to an actuator (e.g., to an actuation member such as a piston of an actuator) of the container release and retention apparatus.

FIG. 1 is an aircraft 100 that can be implemented with an example container retention and release apparatus constructed in accordance with teachings of this disclosure. For example, example container retention and release apparatus disclosed herein can implement a bomb rack that retains and/or releases a container 102 (e.g., a store, a weapon, a missile, etc.) of the aircraft 100 of FIG. 1. The example teachings disclosed herein are not limited to the aircraft 100 of FIG. 1. For example, the container retention and release apparatus disclosed herein can be implemented with other types of aircraft such as, for example, vertical takeoff and landing aircraft, military aircraft, helicopters, drones, commercial aircraft, and/or any other type of aircraft.

Figure 2A:
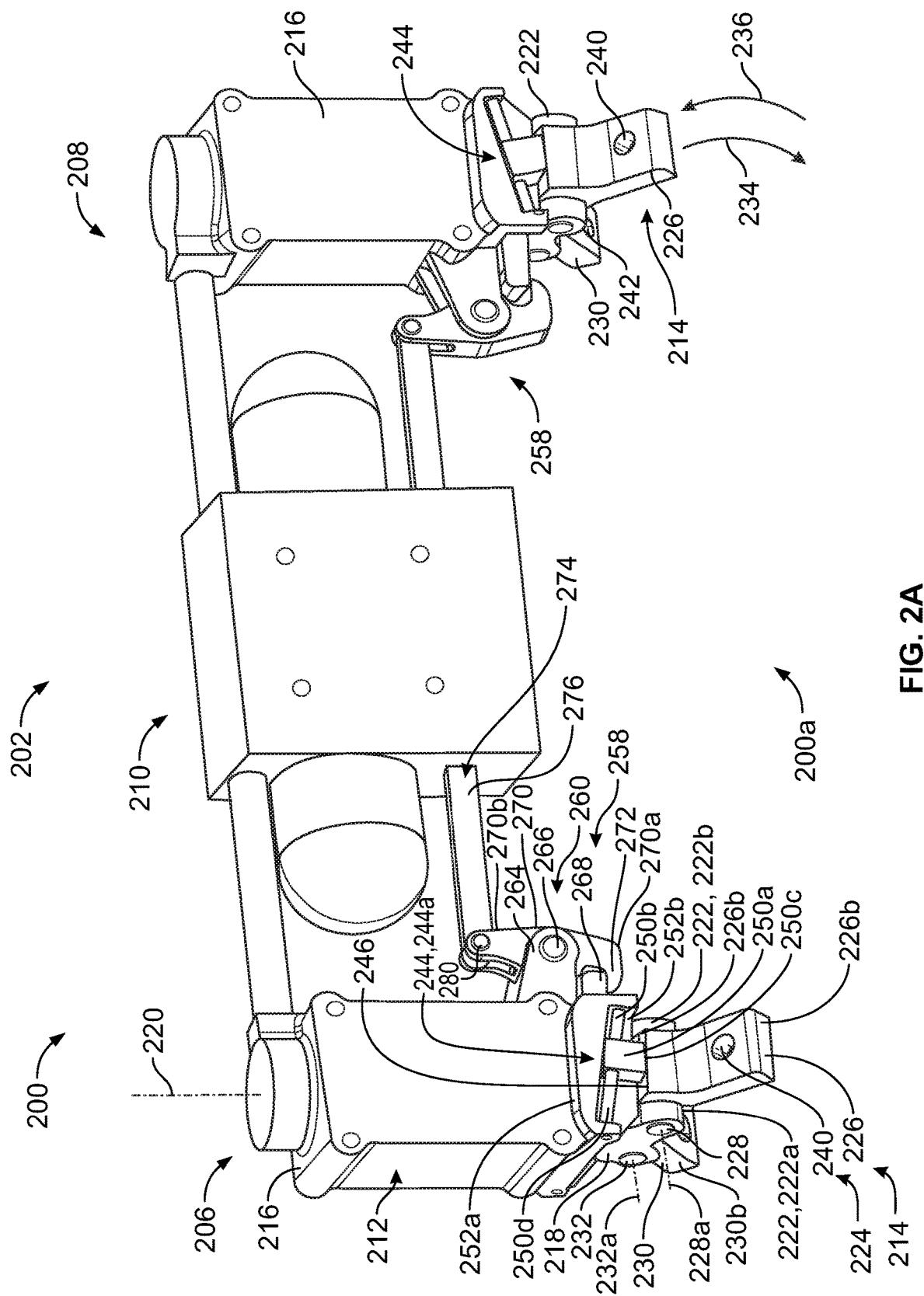
FIG. 2A is a perspective view of a first side of an example container retention and release apparatus constructed in accordance with teachings of this disclosure.
Figure 2B:
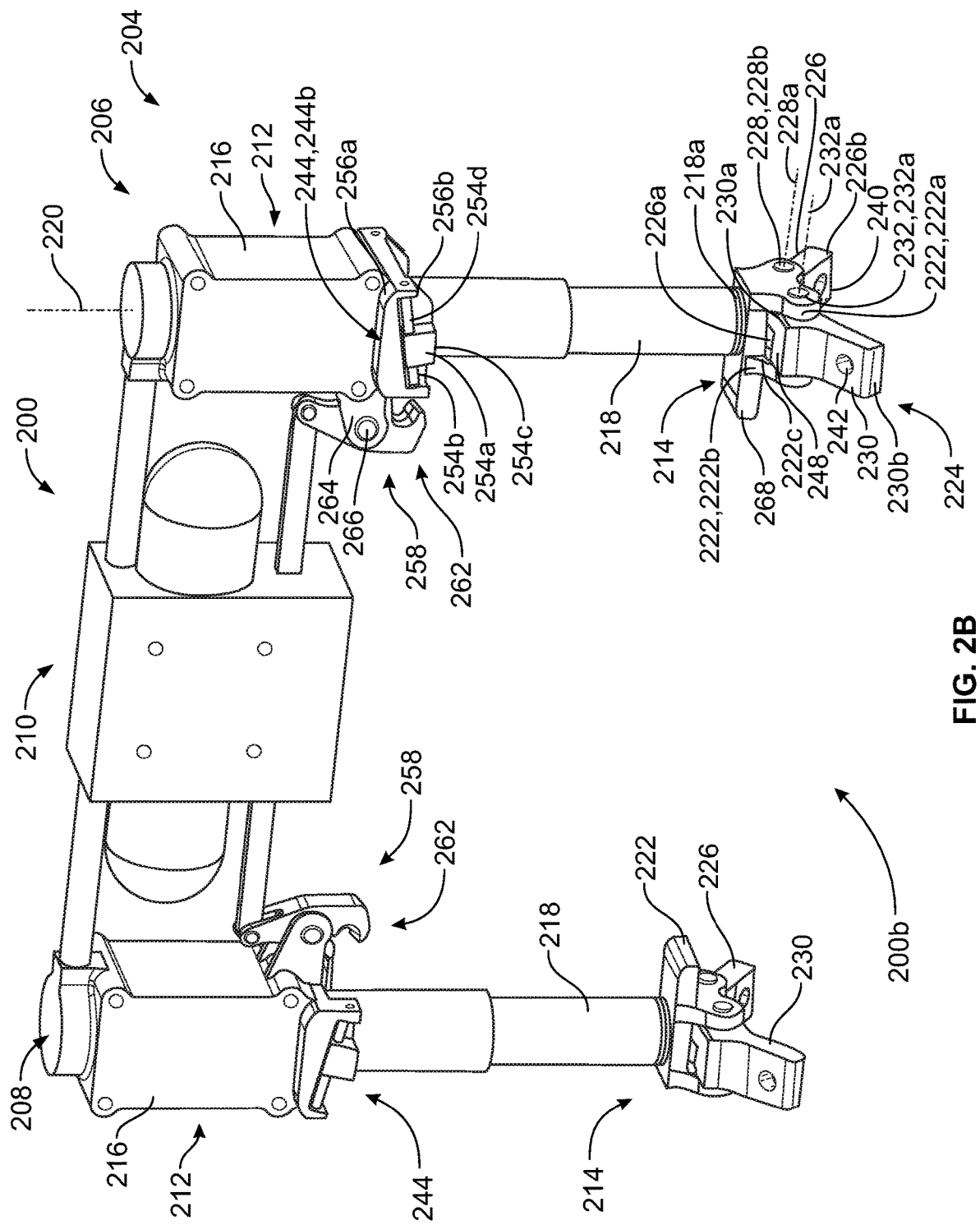
FIG. 2B is a perspective view of a second side of the example container retention and release apparatus of FIG. 2A.

FIGS. 2A and 2B are perspective views of an example container retention and release apparatus 200 disclosed herein. FIG. 2A is a perspective view of a first side 200a of the example container retention and release apparatus 200. FIG. 2B is a perspective view of a second side 200b of the container retention and release apparatus 200. FIG. 2A illustrates the container retention and release apparatus 200 in an example stored position 202. FIG. 2B illustrates the container retention and release apparatus 200 in an example deployed position 204. The aircraft 100 of FIG. 1 can implement the example container retention and release apparatus 200 disclosed herein.

To move the container retention and release apparatus 200 between the stored position 202 (e.g., shown in FIG. 2A) and the deployed position 204 (e.g., shown in FIG. 2B), the container retention and release apparatus 200 of the illustrated example includes a first ejector assembly 206, a second ejector assembly 208, and an energy source 210. The energy source 210 of the illustrated example can be a pneumatic energy source, a hydraulic energy source, a pyrotechnic energy source and/or any other energy source to provide energy to actuate the first ejector assembly 206 and the second ejector assembly 208. The first ejector assembly 206 and the second ejector assembly 208 move together (e.g., synchronously) upon activation of the energy source 210 to release a container. The second ejector assembly 208 is identical (e.g., a mirror image) in both structure and function to the first ejector assembly 206. For brevity and clarity, the first ejector assembly 206 will be discussed in conjunction with the second ejector assembly 208. The first ejector assembly 206 and the second ejector assembly 208 retain and release a container.

To retain and/or release a container, the first ejector assembly 206 of the illustrated example includes an actuator 212 and a swaybrace and retention assembly 214 (e.g., a retention device, a claw, a retainer, a clamp, etc.). Specifically, the swaybrace and retention assembly 214 is pivotally coupled relative to the actuator 212. The actuator 212 of the illustrated example includes a cylinder 216 and a piston 218 movably (e.g., slidably) coupled relative to the cylinder 216. The piston 218 of the illustrated example moves relative to the cylinder 216 in a rectilinear direction along a longitudinal axis 220 (FIG. 2B) of the piston 218. The swaybrace and retention assembly 214 of the illustrated example is coupled to the piston 218. In particular, the swaybrace and retention assembly 214 is pivotally coupled to a first end 218a (FIG. 2B) of the piston 218.

To receive or pivotally support the swaybrace and retention assembly 214, the piston 218 of the illustrated example includes a mounting bracket 222 (e.g., a mounting plate). Specifically, the mounting bracket 222 of the illustrated example is integral with the piston 218 and defines the first end 218a of the piston 218. For example, the mounting bracket 222 can be integrally formed with the piston 218 or coupled to the piston 218 via welding, a fastener (e.g., a screw, a pin, etc.) and/or otherwise fastened or connected to the piston 218. To receive the swaybrace and retention assembly 214, the mounting bracket 222 of the illustrated example includes a first flange 222a (e.g., a first plate) spaced from a second flange 222b (e.g., a second plate) that define an opening 222c.

The swaybrace and retention assembly 214 of the illustrated example is pivotally coupled to the piston 218 via the mounting bracket 222. The swaybrace and retention assembly 214 of the illustrated example includes a swaybrace 224 including a first arm 226 pivotally coupled to the mounting bracket 222 about a first pivot 228 and a second arm 230 pivotally coupled to the mounting bracket 222 about a second pivot 232 different than the first pivot 228 (e.g., a clam shell configuration). The first flange 222a and the second flange 222b of the mounting bracket 222 support the first and second pivots 228, 232. To this end, the first arm 226 of the illustrated example pivots about a first pivot axis 228a and the second arm 230 of the illustrated example pivots about a second pivot axis 232a spaced from the first pivot axis 228a. The first arm 226 can pivot independently relative to the second arm 230.

The first arm 226 rotates about the first pivot 228 and the second arm 230 rotates about the second pivot 232 in a first direction 234 (e.g., a first rotational direction away from the piston 218 or in a downward direction in the orientation of FIGS. 2A and 2B) to retain a container. The first arm 226 rotates about the first pivot 228 and the second arm 230 rotates about the second pivot 232 in a second direction 236 (e.g., a second rotational direction toward the piston 218 or in an upward direction in the orientation of FIGS. 2A and 2B) opposite the first direction 234 to release a container. For example, the first arm 226 rotates in a clockwise direction in the orientation of FIG. 2A when the first arm 226 rotates in the first direction 234 about the first pivot 228 and the second arm 230 rotates in a counterclockwise direction in the orientation of FIG. 2A when the second arm 230 rotates in the first direction 234 about the second pivot 232. The first arm 226 rotates in a counterclockwise direction in the orientation of FIG. 2A when the first arm 226 rotates in a second direction 236 about the second pivot 232 and the second arm 230 rotates in a clockwise direction in the orientation of FIG. 2A when the second arm 230 rotates in the second direction 236 about the second pivot 232.

Referring to FIG. 2B, the first arm 226 includes a first end 226a and a second end 226b and the second arm 230 includes a first end 230a and a second end 230b. A first fastener 228b (e.g., a first pin) is received by respective openings of the first flange 222a, the second flange 222b, and the first end 226a of the first arm 226 to define the first pivot 228 (e.g., to pivotally couple the first arm 226 to the piston 218 via the mounting bracket 222). A second fastener 232b (e.g., a second pin) is received by respective openings of the first flange 222a, the second flange 222b, and at least the first end 230a of the second arm 230 to define the second pivot 232a (e.g., to pivotally couple the second arm 230 to the piston 218 via the mounting bracket 222).

To facilitate pivotal movement of the first and second arms 226, 230, the respective openings of the first end 226a of the first arm 226, the first end 230a of the second arm 230, the first end 230a of the second arm 230 and/or the mounting bracket 222 can include a bushing or a bearing. The first arm 226 of the illustrated example can pivot independently from the second arm 230. In other words, the first arm 226 is not fixed to the second arm 230 in such a manner that pivotal movement of one of the first arm 226 or the second arm 230 does not cause (e.g., simultaneous) pivotal movement of the other one of the first arm 226 or the second arm 230. In some examples, the first arm 226 and the second arm 230 can pivot simultaneously or concurrently.

To retain a container, the swaybrace and retention assembly 214 of the illustrated example includes a first receptacle 240 and a second receptacle 242. Specifically, the second end 226b of the first arm 226 includes the first receptacle 240 and the second end 230b of the second arm 230 includes the second receptacle 242. The first receptacle 240 and the second receptacle 242 of the illustrated example are openings or apertures. In the illustrated example, the first receptacle 240 and the second receptacle 242 are holes or through holes. For example the first receptacle 240 and the second receptacle 242 extend through a thickness (e.g., an entire thickness) of the first arm 226 and the second arm 230. In some examples, the first receptacle 240 and/or the second receptacle 242 partially extend through the first arm 226 and the second arm 230.

To restrict or prevent pivotal movement of the swaybrace and retention assembly 214 (e.g., the first and second arms 226, 230) when the container retention and release apparatus 200 is in the stored position 202, the container retention and release apparatus 200 of the illustrated example includes a lock 244. The lock 244 of the illustrated example prevents pivotal movement of the first arm 226 and the second arm 230 in the second direction 236 (e.g., in the direction toward the piston 218) when the container retention and release apparatus 200 is in the stored position 202. The lock 244 of the illustrated example include a first lock 244a located on the first side 200a of the container retention and release apparatus 200 and a second lock 244b located on the second side 200b of the container retention and release apparatus 200. Specifically, the first lock 244a interfaces with the first arm 226 and the second lock 244b interfaces with the second arm 230. For example, the first lock 244a of the illustrated example engages a first surface 246 (e.g., a bearing surface) of the first arm 226 (e.g., defined at the first end 226a of the first arm 226) and the second lock 244b engages a second surface 248 (e.g., a bearing surface) of the second arm 230 (e.g., defined by the first end 230a of the second arm 230).

The first lock 244a of the illustrated example is a first wedge 250a slidably coupled to a first guide 250b that is supported by the cylinder 216. For example, the cylinder 216 includes a first flange 252a defining a first recessed opening 252b to support the first guide 250b. Similarly, the second lock 244b of the illustrated example is a second wedge 254a slidably coupled to a second guide 254b that is supported by the cylinder 216. For example, the cylinder 216 includes a second flange 256a defining a second recessed opening 256b to support the second guide 254b. To allow the swaybrace and retention assembly 214 (e.g., to adjust to different stored or initial positions) to accommodate different sized containers (e.g., weapons or stores), the first wedge 250a is adjustable along a length of the first guide 250b and the second wedge 254a is adjustable along a length of the second guide 254b.

The first guide 250b has a longitudinal axis that is non-parallel relative to horizontal. In other words, the first guide 250b is positioned at an angle relative to horizontal (e.g., the first pivot axis 228a). The first wedge 250a includes a first tapered surface 250c to engage the first surface 246 of the first arm 226. Likewise, the second guide 254b has a longitudinal axis that is non-parallel relative to horizontal. In other words, the second guide 254b is positioned at an angle relative to horizontal (e.g., the second pivot axis 232a). The second wedge 254a includes a second tapered surface 254c to engage the second surface 248 of the second arm 230. To increase a retention force of the lock 244 when the container retention and release apparatus 200 is in the stored position 202, the first lock 244a includes a first biasing element 250d (e.g., a spring) to bias the first lock 244a toward the first surface 246 of the first arm 226 and the second lock 244b includes a second biasing element 254d (e.g., a spring) to bias the second lock 244b toward the second surface 248 of the second arm 230. The first biasing element 250d enables the first wedge 250a to adjust along the first guide 250b and the second biasing element 254d enables the second wedge 254a to adjust along the second guide 254b to enable the lock 244 to accommodate differently sized (e.g., different diameter) containers.

To restrict or prevent (e.g., rectilinear) movement of the piston 218 relative to the cylinder 216 when the container retention and release apparatus 200 is in the stored position 202, the container retention and release apparatus 200 of the illustrated example includes a latch 258. The latch 258 is movable between a first or latched position 260 to secure the piston 218 and a second or unlatched position 262 to release the piston 218. The latch 258 of the illustrated example is coupled to the cylinder 216 via a bracket 264 formed with the cylinder 216. The latch 258 is pivotally coupled to the bracket 264 via a pin 266. To engage or couple to the piston 218, the latch 258 of the illustrated example engages or interfaces with a locking flange 268 formed adjacent the first end 218a of the piston 218. Specifically, the mounting bracket 222 of the illustrated example includes the locking flange 268. For example, the locking flange 268 is integrally formed with the mounting bracket 222. The locking flange 268 of the illustrated example is substantially perpendicular relative to the first flange 222a and the second flange 222b. As used herein, substantially perpendicular means perfectly perpendicular (e.g., 90 degrees) or approximately perpendicular (e.g., within 10% of perfectly perpendicular). Specifically, the latch 258 of the illustrated example includes a body 270 having a hook 272 at a first end 270a of the body 270 that removably couples or engages to the locking flange 268 of the piston 218. To move the latch 258 between the latched position 260 and the unlatched position 262, the container retention and release apparatus 200 of the illustrated example includes a drive system 274. For example, the drive system 274 includes a transmission 276 that operatively couples to a second end 270b of the body 270. For example, the second end 270b is a yoke or clevis end to receive a link (e.g., a bar) of the transmission 276. A pin 280 pivotally couples the second end 270b of the body 270 to the transmission 276. The drive system 274 includes a drive (e.g., a motor, an actuator, etc.) to move or toggle the latch 258 about the pin 266 between the latched position 260 to engage the locking flange 268 and the unlatched position 262 to release the locking flange 268.

As noted above, the second ejector assembly 208 is identical to the first ejector assembly 206. The second ejector assembly 208 includes a cylinder 216 (e.g., a second cylinder), a piston 218 (e.g., a second piston), a swaybrace and retention assembly 214 (e.g., a second swaybrace and retention assembly) that includes a first arm 226 (e.g., a third arm) and a second arm 230 (e.g., a fourth arm) pivotally coupled to the piston 218 via a mounting bracket 222 (e.g., a second mounting plate), a first receptacle 240 (e.g., a third receptacle), a second receptacle 242 (e.g., a fourth receptacle), the lock 244 and the latch 258. The first ejector assembly 206 and the second ejector assembly 208 of the illustrated example operate together to move a container between the stored position 202 and the deployed position 204.

Figure 3A:
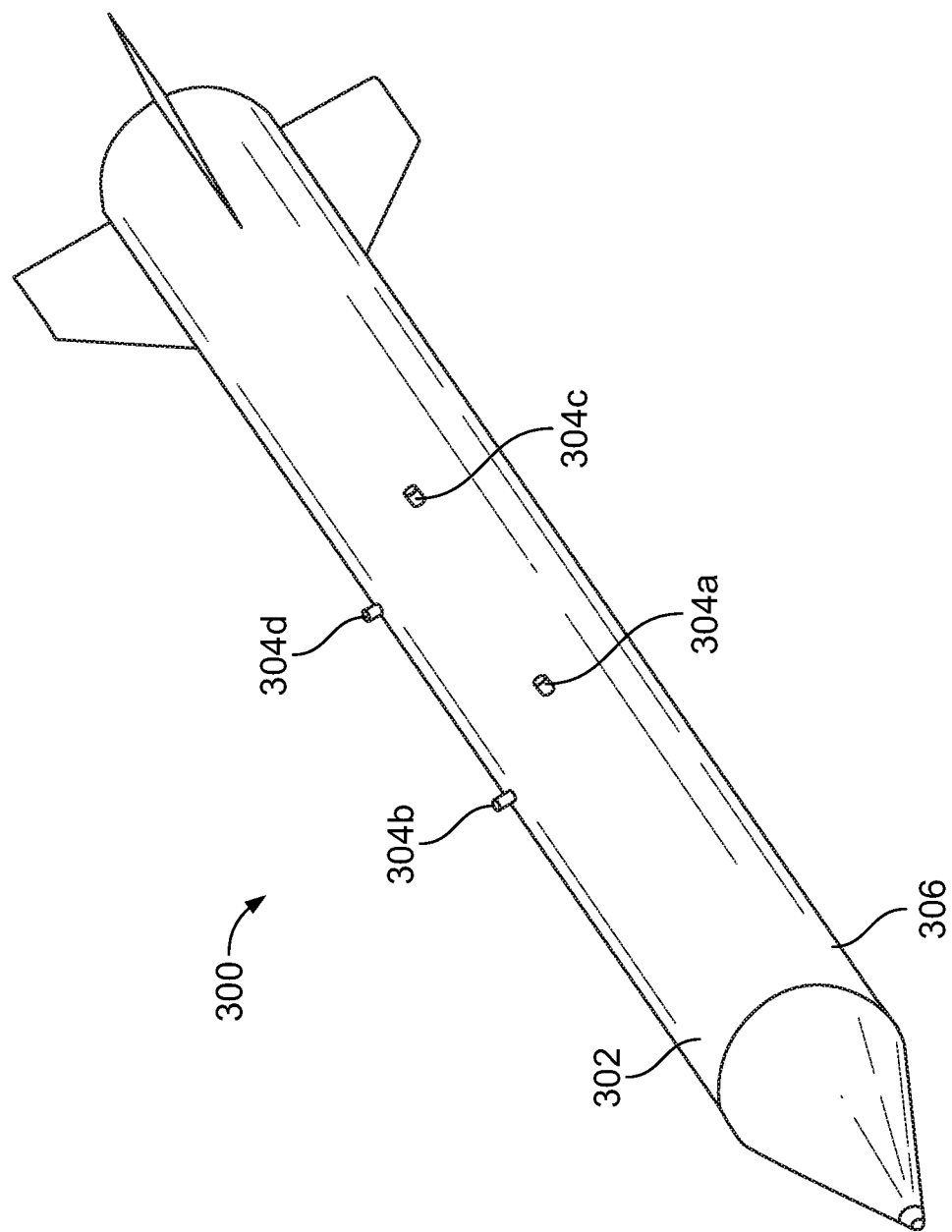
FIG. 3A is a perspective view of an example container that can be carried by the example container retention and release apparatus of FIGS. 2A and 2B.
Figure 3B:
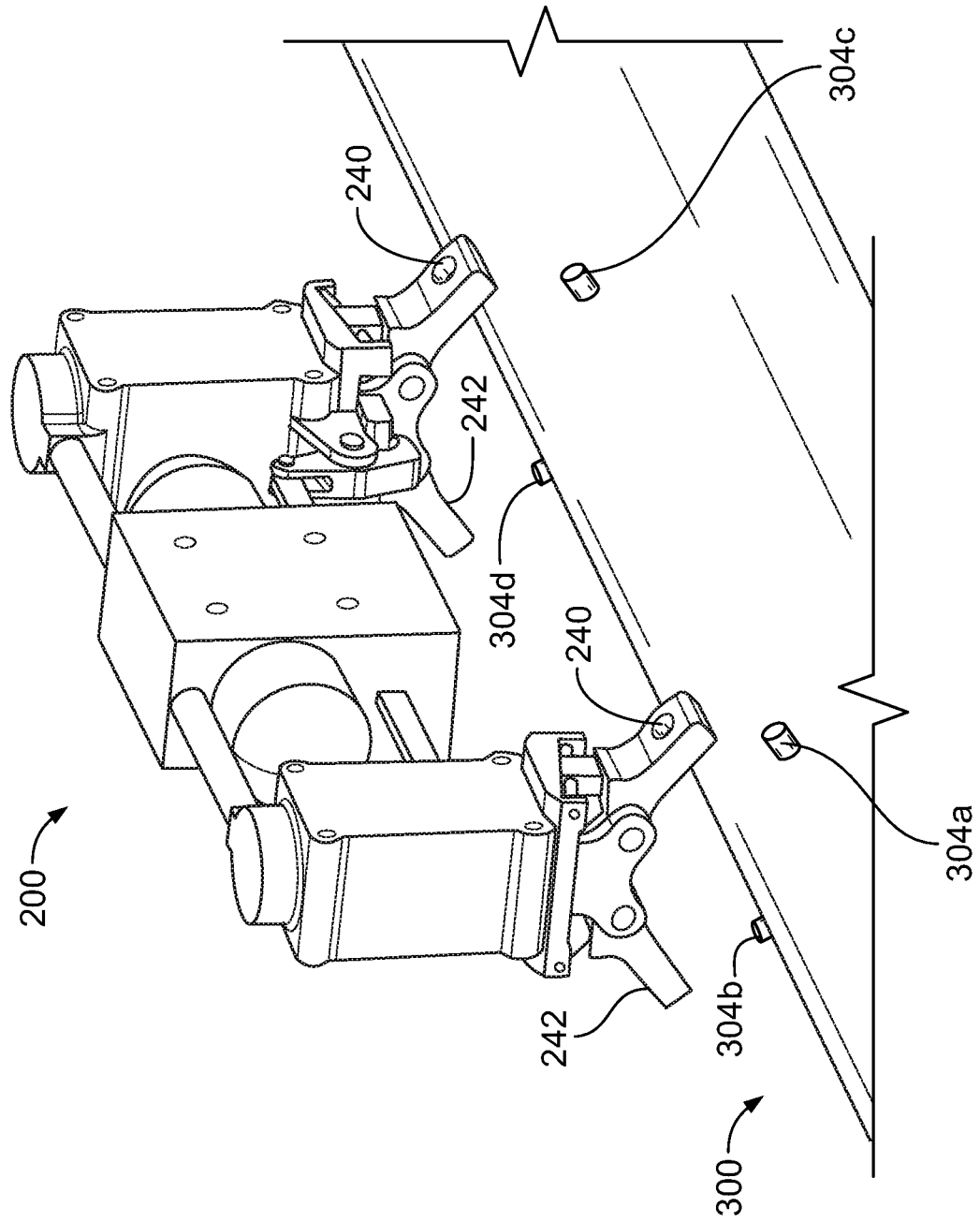
FIG. 3B is an enlarged, perspective view of the example container retention and release apparatus of FIGS. 2A and 2B and the example container of FIG. 3A.

FIG. 3A is a perspective view of a container 300 that can be retained by the container retention and release apparatus 200 of FIGS. 2A and 2B. FIG. 3B is an enlarged, perspective view of the container retention and release apparatus 200 of FIGS. 2A and 2B and the container 300 of FIG. 3A. The container 300 of the illustrated example is a store or weapon (e.g., the container 102 of FIG. 1). The container 300 includes a body 302 having a cylindrical shape. The body 302 of the illustrated example includes a plurality of posts 304a-d (e.g., posts). The posts 304a-d of the illustrated example are cylindrically shaped posts that protrude from an outer surface 306 of the body 302. To mount the container 300 to the container retention and release apparatus 200, respective ones of the first receptacles 240 receive respective ones of the posts 304a and 304c and respective ones of the second receptacles 242 receive respective ones of the posts 304b and 304d. The posts 304a-d of the illustrated example have a cylindrically-shaped body. Each of the posts 304a-d has a diameter that is smaller than a diameter of the first and second receptacles 240-242. The first and second receptacles 240, 242 have openings and/or profiles that are complementary to the shapes or profiles of the posts 304a-d. Thus, the first and second receptacles matably receive the posts 304a-d. The posts 304a-d and the first and second receptacles 240, 242 of the illustrated example have the same shapes or profiles (e.g., cylindrical shapes).

FIGS. 4A and 4B are partial, perspective views of other example containers 400 and 401 disclosed herein. The container 400 of FIG. 4A includes posts 400a-d (e.g., posts)

that protrude from an outer surface 403 of the container 400. The posts 400*a-d* include curved surfaces 402 and straight (e.g., flat) surfaces 404. Posts 401*a-d* of the container 401 have a rectangular shape. The first and second receptacles 240, 242 can be shaped or configured to receive the posts 400*a-d* and/or the posts 401*a-d*. In other examples, one or more of the posts 304*a-d* and/or the first and second receptacles 240, 242 can have different shapes or profiles. For example, in some examples, one or more of the posts 304*a-d* and a corresponding one or more of the first and second receptacles 240, 242 can have a diamond shape, a square shape, a hexagonal shape, a rectangular shape, semi-circular shape, and/or any other polygonal shape and/or any other shape(s). In some examples, non-cylindrically shaped posts and/or receptacles provide an increased bearing area (e.g., a larger surface area) compared to the cylindrically-shaped shaped posts 304*a-d* and/or the first and second receptacles 240, 242, and thereby increase a load carrying capability to enable the container retention and release apparatus to carry heavier containers (weapons) compared to, for example, the container retention and release apparatus 200 of FIGS. 2A and 2B. For example, a round pin in a round receptacle has lower bearing load capability and also lower shear strength than, for example, a non-cylindrical retention pin in a non-cylindrical opening or receptacle. Additionally, the polygonal-shaped posts can be less susceptible to radar detection. For example, the posts can be shaped and/or oriented to reflect radar signals transmitted by a radar transmitter away from the radar transmitter to reduce detectability of the container (e.g., a store) by radar. In contrast, a cylindrically-shaped receptacle cannot be tailored to reduce detectability by radar, whereas a non-cylindrically shaped receptacle (e.g., a square, a diamond, a hex, etc.) can be orientated to reduce detectability by radar. The posts may be coated with radar absorbent material to further reduce detectability by radar.

Figure 5:
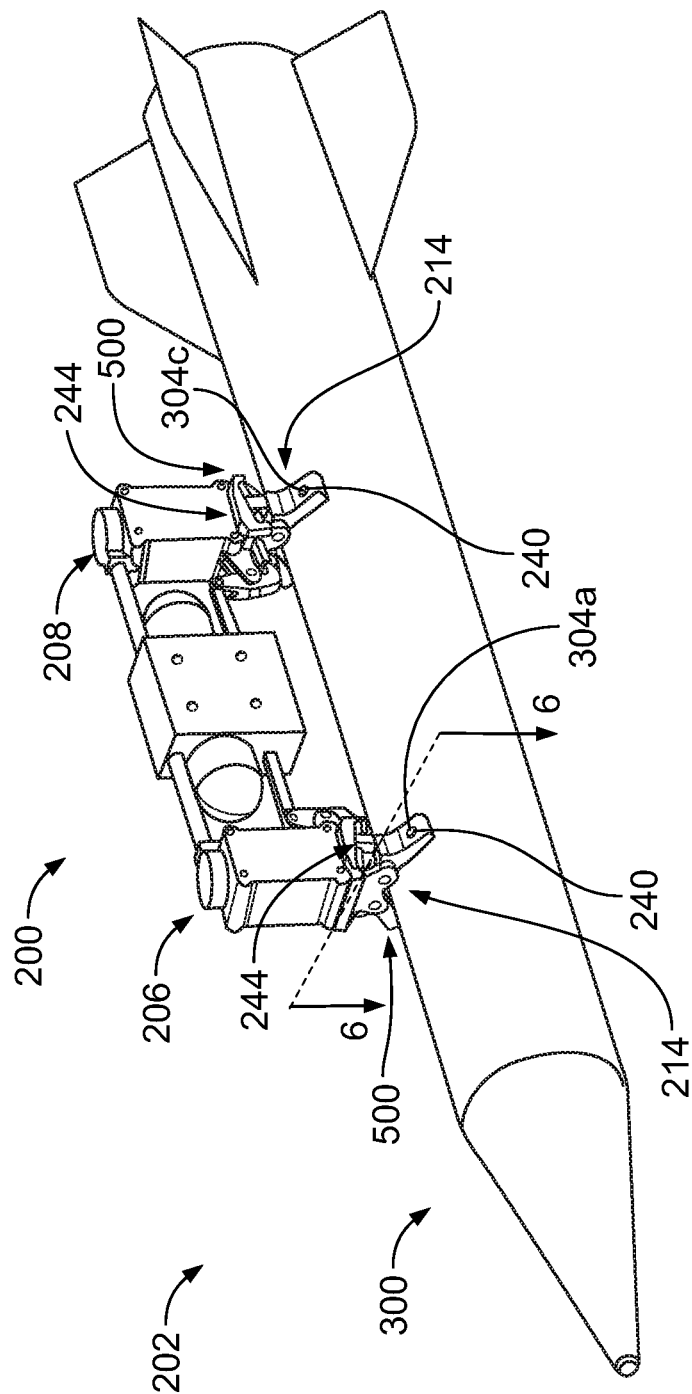
FIG. 5 is a perspective view of the example container retention and release apparatus of FIGS. 2A and 2B coupled to the example container of FIG. 3 shown in an example stored position.

FIG. 5 is a perspective view of the container retention and release apparatus 200 of FIGS. 2A and 2B coupled to the container 300 of FIG. 3. The container retention and release apparatus 200 is in the stored position 202. The first receptacle 240 of the first arm 226 of the first ejector assembly 206 receives the first post 304*a* and the second receptacle 242 of the second arm 230 receives the second post 304*b*. Likewise, the first receptacle 240 of the first arm 226 of the second ejector assembly 208 receives the third post 304*c* and the second receptacle 242 of the second arm 230 of the second ejector assembly 208 receives the fourth post 304*d*. The swaybrace and retention assembly 214 of the first ejector assembly 206 and the swaybrace and retention assembly 214 of the second ejector assembly 208 retain (e.g., clamp) the container 300 in a stored position. In the stored position 202, the swaybrace and retention assembly 214 is in a clamping position 500 and provides a clamping or holding force to retain the container 300 coupled to the container retention and release apparatus 200. Specifically, the interaction between the first and second arms 226, 230 relative to the container 300 and the interaction between the locks 244 and the first and second arms 226, 230 generate the clamping and holding force provided by the swaybrace and retention assembly 214.

Figure 6:
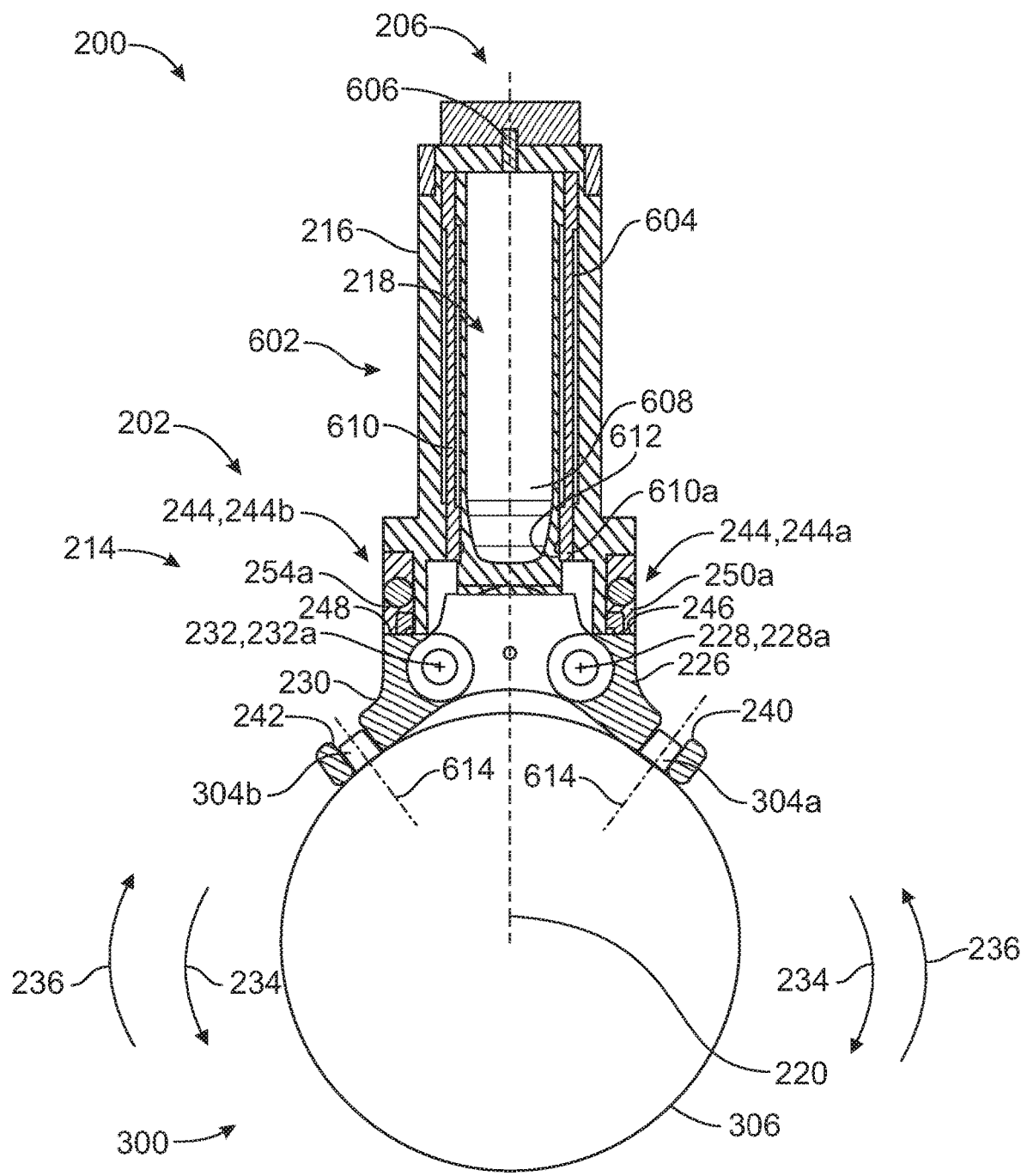
FIG. 6 is a cross-sectional view taken along line 6-6 of FIG. 5.

FIG. 6 is a front, cross-sectional view of the container retention and release apparatus 200 and the container 300 taken along 6-6 of FIG. 5. In the stored position 202, the piston 218 of the first ejector assembly 206 (and the piston 218 of the second ejector assembly 208) is in a first stroke position 602 (and the piston 218 of the second ejector assembly 208). The cylinder 216 of the illustrated example defines a cavity 604 to receive (e.g., at least a portion of) the piston 218 when the piston 218 is in the first stroke position 602. The cylinder 216 includes a port 606 to receive energy (e.g., pneumatic air, hydraulic oil, etc.) from the energy source 210. The piston 218 of the illustrated example includes a first or inner portion 608 (e.g., including a piston head) and a second or outer portion 610 (e.g., a sleeve). Specifically, the inner portion 608 is slidably coupled to the outer portion 610, and the inner and outer portions 608, 610 are slidably coupled to the cylinder 216. For example, the inner portion 608 is nested with the outer portion 610 when the piston 218 is in the first stroke position 602. In the stored position, the latch 258 is in the latched position 260. For example, the hook 272 is engaged with the locking flange 268 of the piston 218 to prevent the inner portion 608 and the outer portion 610 from moving relative to the cylinder 216. Specifically, inner portion 608 of the piston 218 includes a shoulder 612 (e.g., formed via an annular recess on an outer surface of the inner portion 608) that is to engage a first end 610*a* of the outer portion 610 to restrict movement of the outer portion 610 relative to the inner portion 608.

In the stored position 202, the swaybrace and retention assembly 214 and the locks 244 provide the clamping or holding force to retain the container 300 coupled to the container retention and release apparatus 200. Specifically, the interaction between the first and second arms 226, 230 relative to the container 300 and the interaction between the locks 244 and the first and second arms 226, 230 generate the clamping and holding force provided by the swaybrace and retention assembly 214. The first and second locks 244*a*, 244*b* are in engagement with the respective first and second surfaces 246, 248 of the first and second arms 226, 230 and prevent or restrict rotation of the first and second arms 226, 230 about the respective first and second pivots 228, 232 in the second direction 236. In turn, the first and second wedges 250*a*, 254*a* impart forces to the respective first and second arms 226, 230 in the first direction 234. Additionally, at least a portion of the first arm 226 and the second arm 230 are in engagement with the outer surface 306 of the body 302.

Additionally, the first receptacle 240 of the first arm 226 receives or engages (e.g., at least a portion of) the first post 304*a* of the container 300 and the second receptacle 242 of the second arm 230 receives or engages (e.g., at least a portion of) the second post 304*b*. To this end, engagement between the first lock 244*a* and the first surface 246, engagement between the first arm 226 and the outer surface 306 of the container 300, and engagement between the first post 304*a* and the first receptacle 240 prevents rotation of the first arm 226 about the first pivot 228*a* in the first direction 234 and the second direction 236. Likewise, engagement between the second lock 244*b* and the second surface 248, engagement between the second arm 230 and the outer surface 306 of the container 300, and engagement between the second post 304*b* and the second receptacle 242 prevents rotation of the second arm 230 about the second pivot axis 232*a* in the first direction 234 and the second direction 236. Each of the first receptacle 240 and the second receptacle 242 has a longitudinal axis 614 that is angled or canted relative to the longitudinal axis 220 of the piston 218. For example, the longitudinal axes 614 are at an angle of between approximately 25 degrees and 85 degrees relative to the longitudinal axis 220. Thus, the first arm 226 and the second arm 230 provide the clamping or holding force in a direction toward the body 302 of the container 300 (e.g., along the longitudinal axes 614 of the respective first and second receptacles 240, 242). Further, engagement between the first post 304*a* and the second post 304*b* with the respective first and second arms 226, 230 when inserted in the first and second receptacles 240, 242 provides a bearing force to retain the container 300 coupled to the swaybrace and retention assembly 214.

Figure 7:
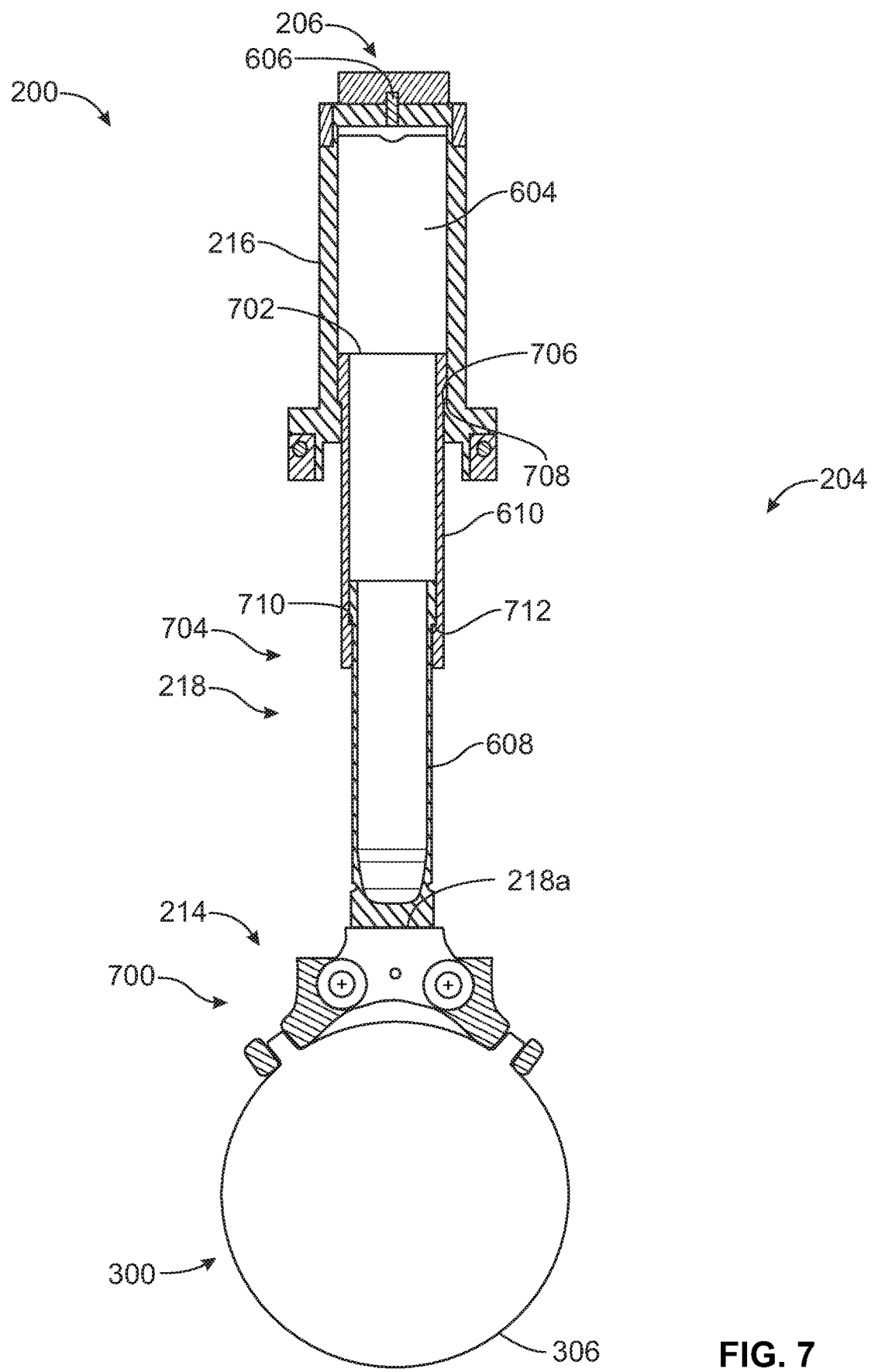
FIG. 7 is a cross-sectional view similar to FIG. 6 but showing the example container retention and release apparatus in an example deployed position.

FIG. 7 is a front, cross-sectional view similar to FIG. 6, but showing the container retention and release apparatus 200 in the deployed position 204 and the swaybrace and retention assembly 214 in an intermediate clamping position 700. In the deployed position 204, the container retention and release apparatus 200 moves the container 300 away from the cylinder 216 (e.g., away from the aircraft 100) to release the container 300. To move the container retention and release apparatus 200 to the deployed position 204, the drive system 274 (FIGS. 2A and 2B) disengages or releases the latch 258 from the piston 218. Specifically, the latch 258 moves to the unlatched position 262 shown in FIG. 2B. The energy source 210 provides energy (e.g., pressurized fluid) in the cavity 604 via the port 606 of the cylinder 216 that imparts a force on a second side 702 of the piston 218 opposite the first end 218a to cause the piston 218 to move to a second stroke position 704 (e.g., an end of stroke position). The piston 218 moves to the second stroke position 704 to position the container 300 away from the cylinder 216 prior to releasing the container 300 from the container retention and release apparatus 200. When the piston 218 exits the cylinder 216 (e.g., the piston 218 moves from the first stroke position 602 to the second stroke position 704), the outer portion 610 slides relative to the cylinder 216 (with the inner portion 608 nested with the outer portion 610). Specifically, the outer portion 610 moves relative to the cylinder 216 until a first shoulder 706 of the outer portion 610 engages a second shoulder 708 of the cylinder 216. Engagement between the first shoulder 706 of the outer portion 610 and the second shoulder 708 of the cylinder 216 causes the inner portion 608 to move relative to the outer portion 610. Specifically, the inner portion 608 moves relative to the outer portion 610 in a direction away from the cylinder 216 until a third shoulder 710 of the inner portion 608 engages a fourth shoulder 712 of the outer portion 610. Thus, the piston 218 moves to the second stroke position 704 (e.g., an end of stroke position) when the first shoulder 706 engages the second shoulder 708 (e.g., the outer portion 610 is in a fully extended position relative to the cylinder 216) and the third shoulder 710 engages the fourth shoulder 712 (e.g., the inner portion 608 is in a fully extended position relative to the outer portion 610). During extension of the piston 218 from the cylinder 216 (e.g., as the piston 218 moves from the first stroke position 602 to the second stroke position 704), the swaybrace and retention assembly 214 can rotate freely (e.g., the first and second arms 226, 230 can rotate about the first and second pivots 228, 232). However, ejection forces generated by the energy source 210 maintain the swaybrace and retention assembly 214 in the intermediate clamping position 700 (as the piston 218 moves to the deployed position 204). In the intermediate clamping position 700, the first and second arms 226, 230 remain engaged with the outer surface 306 of the container 300. In other words, the first and second posts 304a, 304b remain engaged with the respective first and second receptacles 240, 242 when the piston 218 moves between the first stroke position 602 and the second stroke position 704. However, the swaybrace and retention assembly 214 is in the intermediate clamping position 700 because the first and second arms 226, 230 are not in engagement with the respective first and second locks 244a, 244b.

Figure 8:
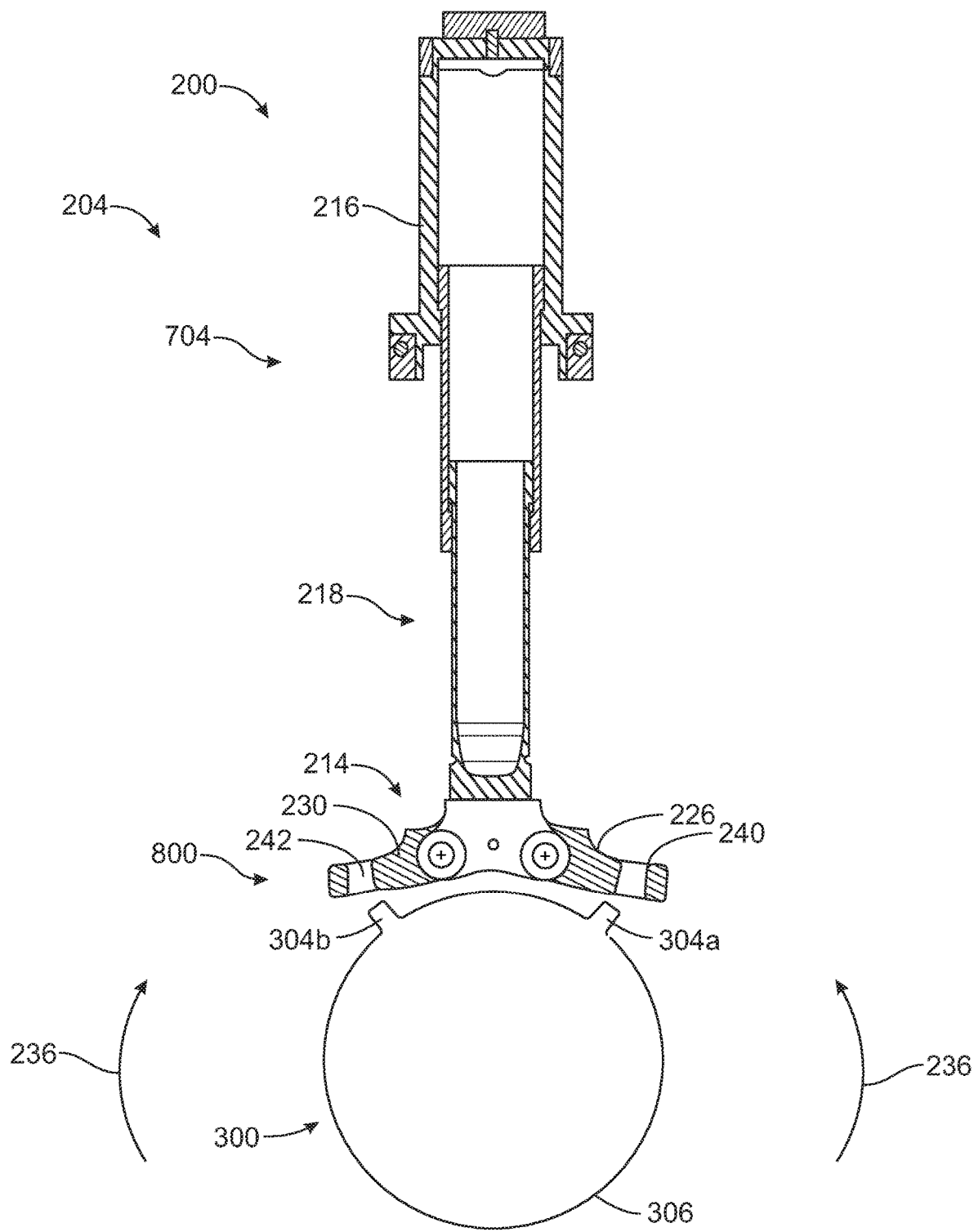
FIG. 8 is a cross-sectional view similar to FIG. 6 but showing the example container retention and release apparatus in an example release position.

FIG. 8 is a front, cross-sectional view similar to FIGS. 6 and 7, but showing the container retention and release apparatus 200 in the deployed position 204 and the swaybrace and retention assembly 214 in a release position 800. As the piston 218 reaches the second stroke position 704 (e.g., an end of stroke position), inertia of the container 300 imparts a moment force on the swaybrace and retention assembly 214. The moment force causes the first arm 226 and the second arm 230 to rotate about the respective first and second pivots 228, 232, causing the second ends 226b, 230b of the first and second arms 226, 230 to rotate in the second direction 236. As the first and second arms 226, 230 rotate about the respective first and second pivots 228, 232 in the second direction 236, the first and second arms 226, 230 move away from the container 300 to disengage the container 300. Additionally, the first post 304a disengages or withdraws from the first receptacle 240 and the second post 304b disengages or withdraws from the second receptacle 242, thereby releasing the container 300. A dimensional clearance between the first and second receptacles 240, 242 and the respective first and second posts 304a, 304b enables the first and second arms 226, 230 to rotate to release the container 300. Thus, the swaybrace and retention assembly 214 (e.g., the first and second arms 226, 230) pivot between the clamping position 500 to cause the first and second receptacles 240, 242 to engage the respective first and second posts 304a, 304b of the container 300 and the release position 800 to cause the first and second receptacles 240, 242 to disengage the respective first and second posts 304a-b.

The example container retention and release apparatus 200 of the illustrated example controls an orientation of the container 300 and/or motion thereof during an ejection event. For example, the container retention and release apparatus 200 of the illustrated example controls an orientation and/or motion of the container 300 in all three major axes (e.g., the pitch axis, the roll axis and the yaw axis) by physically retaining the container 300 throughout the ejection of the container (e.g., as the piston 218 moves from the first stroke position 602 to the second stroke position 704). The independently pivoting first and second arms 226, 230 eliminate rotation of the container 300 about its longitudinal axis and, thereby, eliminate a potential for the container 300 to roll during the ejection of the container. Additionally, the first and second arms 226, 230 reduce (e.g., minimize) space requirements for both internally and externally carried weapons. For example, the swaybrace and retention assembly 214 (e.g., the first and second arms 226,230) reduce space needed for the first and second arms 226, 230 and reduce a height that is needed for the first ejector assembly 206 and the second ejector assembly 208.

Figure 9:
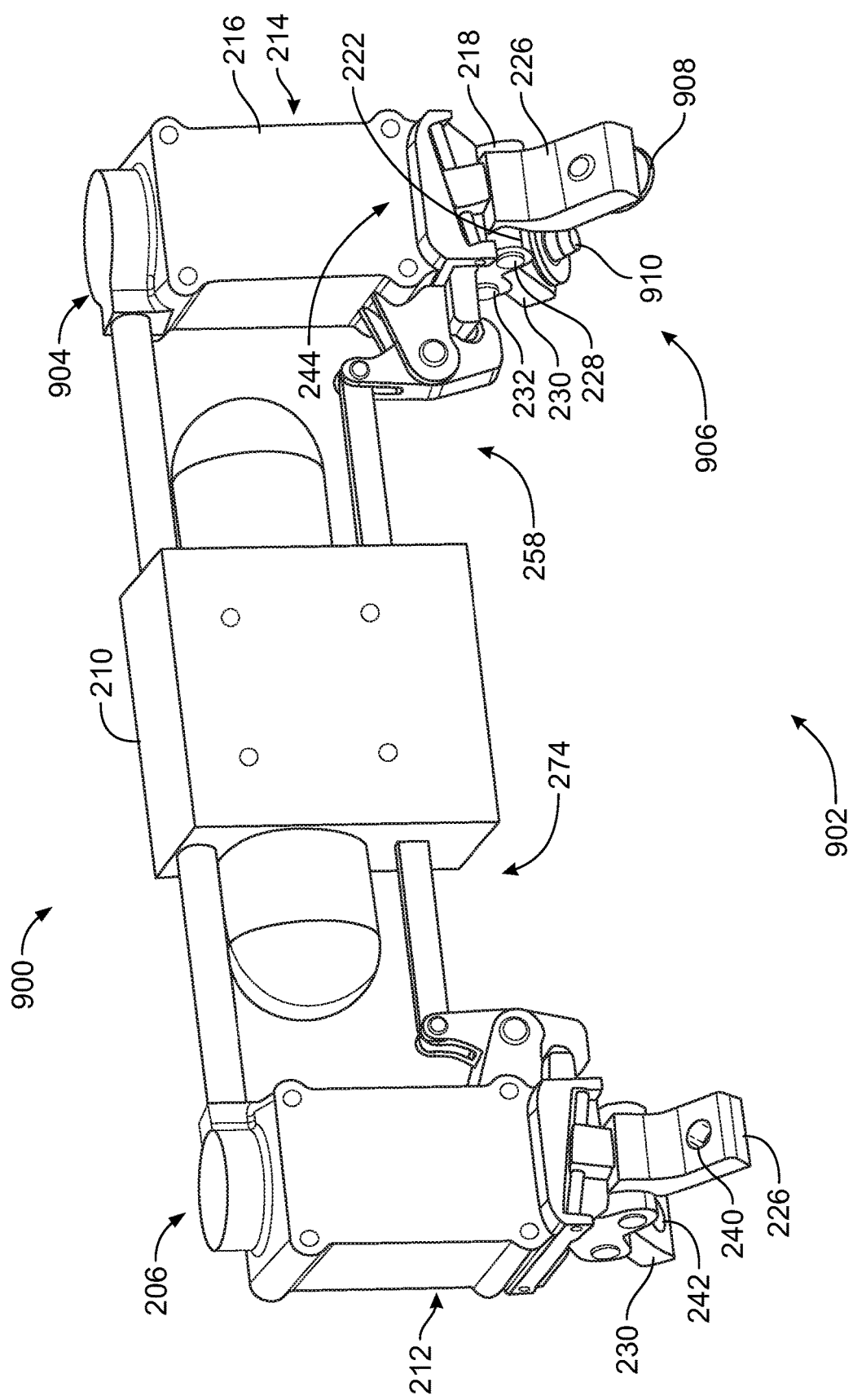
FIG. 9 is a perspective view of another example container retention and release apparatus disclosed herein.
Figure 12:
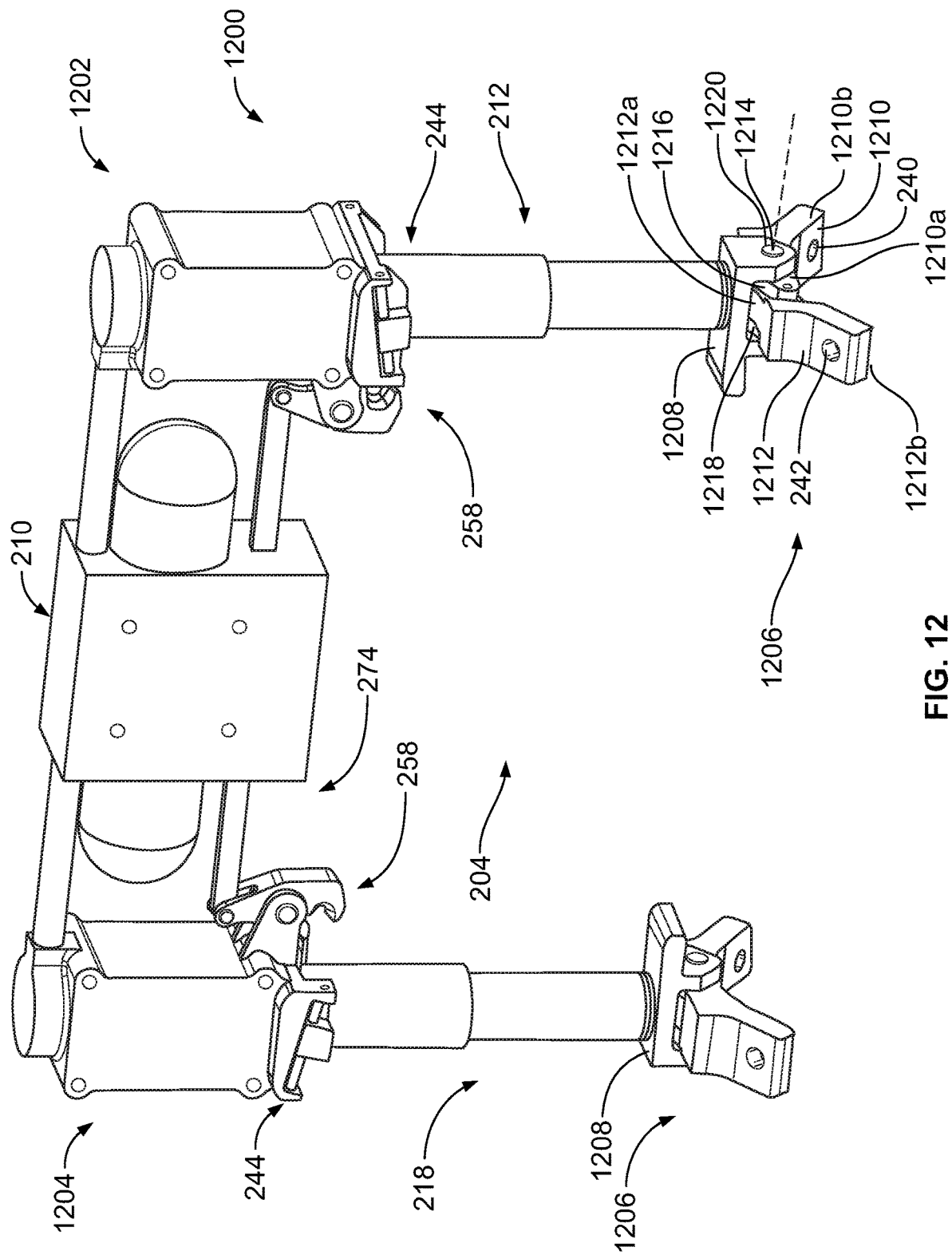
FIG. 12 is a perspective view of another example container retention and release apparatus disclosed herein.

FIGS. 9, 12, and 13 illustrate other example container retention and release apparatus 900, 1200 and 1300 disclosed herein. For example, the example container retention and release apparatus 900, 1200 and 1300 can implement a bomb rack of the aircraft 100 of FIG. 1. Those components of the example container retention and release apparatus 900, 1200 and 1300 of FIGS. 9, 12, and 13 that are substantially similar or identical to the components of the container retention and release apparatus 200 described above and that have functions substantially similar or identical to the functions of those components will not be described in detail again below. Instead, the interested reader is referred to the above corresponding descriptions. To facilitate this process, identical reference numbers will be used for like structures.

FIG. 9 is a perspective view of another example container retention and release apparatus 900 disclosed herein. FIG. 9 illustrates the container retention and release apparatus 900 in a stored position 902. The container retention and release apparatus 900 of the illustrated example includes a first ejector assembly 206, a second ejector assembly 904, and an energy source 210. The first ejector assembly 206 is identical to the first ejector assembly 206 of FIGS. 2A and 2B. The second ejector assembly 904 of the illustrated example include a cylinder 216, a piston 218, a lock 244, a latch 258, and a drive system 274. However, the container retention and release apparatus 900 includes a swaybrace and retention assembly 906 that is different from the swaybrace and retention assembly 214 of the container retention and release apparatus 200. The swaybrace and retention assembly 906 of the illustrated example includes a first arm 226 pivotally coupled to a mounting bracket 222 via a first pivot 228 and a second arm 230 pivotally coupled to the mounting bracket 222 via a second pivot 232. To retain a container, the swaybrace and retention assembly 906 of the illustrated example includes a first retainer 908 and a second retainer 910. The first retainer 908 is coupled to (e.g., carried by) the first arm 226 and the second retainer 910 is coupled to (e.g., carried by) of the second arm 230. The first retainer 908 is coupled (e.g., threadably coupled, welded, fastened or integrally formed) to the first arm 226 and the second retainer 910 is coupled (e.g., threadably coupled, welded, fastened or integrally formed) to the second arm 230. For example, the first retainer 908 is coupled to a first opening (e.g., the first receptacle 240 of FIG. 2A) and the second retainer 910 is coupled to a second opening (e.g., the second receptacle 242 of FIG. 2A).

Figure 10A:
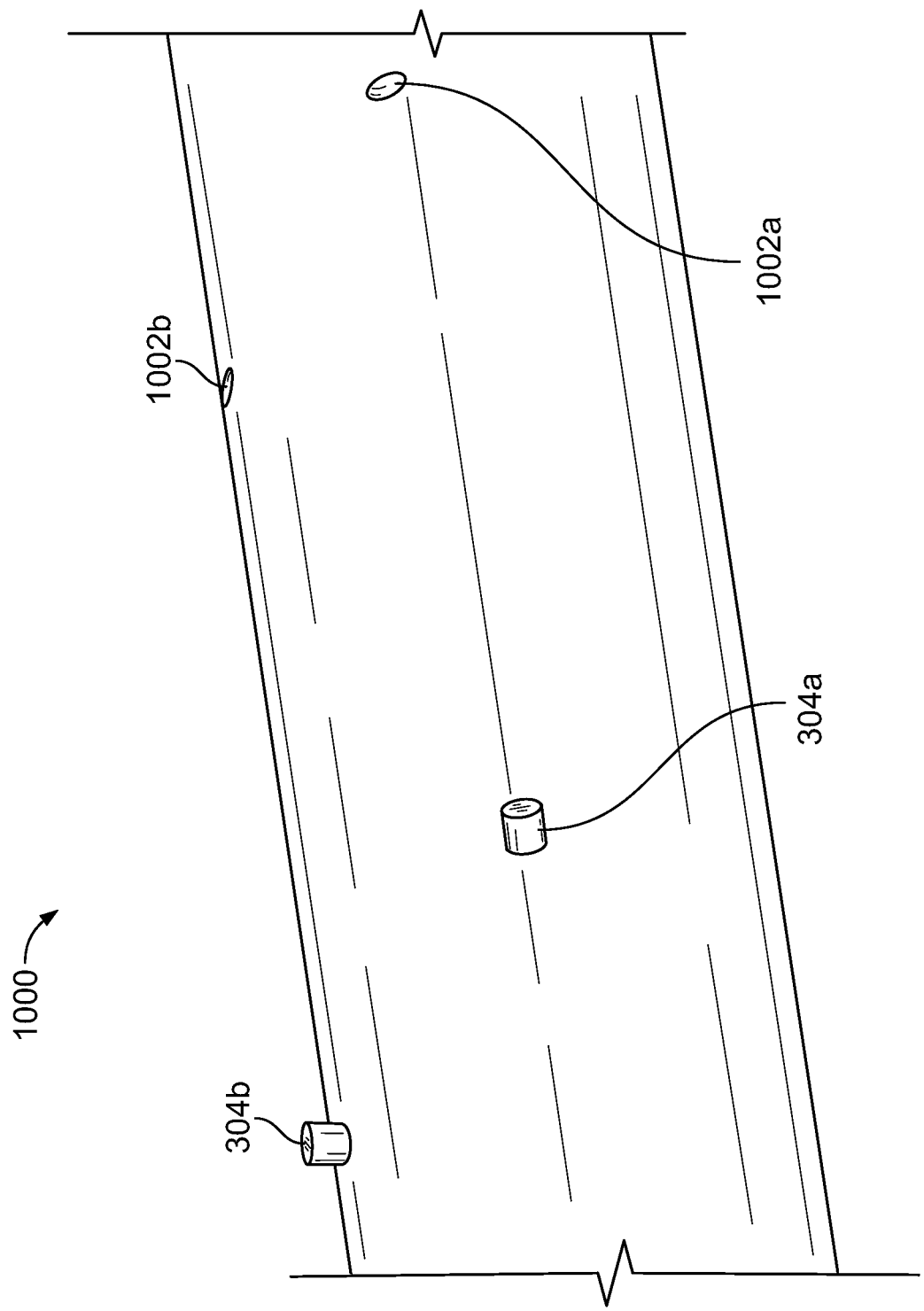
FIG. 10A is an enlarged, partial view of another example container disclosed herein that can be used with the example container retention and release apparatus of FIG. 9.

FIG. 10A is a perspective view of a container 1000 that can be retained by the container retention and release apparatus 900 of FIG. 9. The container 1000 of the illustrated example is a store or weapon (e.g., the container 102 of FIG. 1). The container 1000 has a plurality of posts 304a, 304b and a plurality of openings 1002a, 1002b (e.g., receptacles). The first and second receptacles 240, 242 of the first ejector assembly 206 receive the first and second posts 304a-b and first and second openings 1002a, 1002b of the container 1000 receive respective ones of the first and second retainers 908 and 910 of the second ejector assembly 904.

Figure 10C:
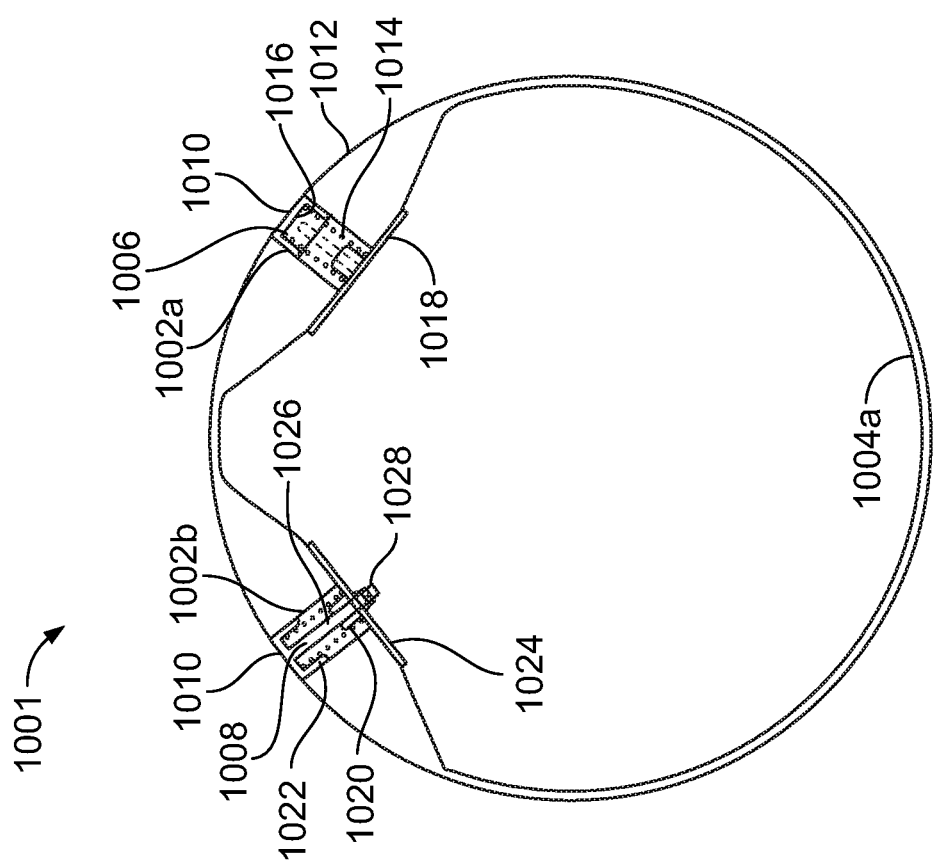
FIGS. 10B and 10C are cross-sectional views of other example containers that can be used with the example container retention and release apparatus of FIG. 9.
Figure 10B:
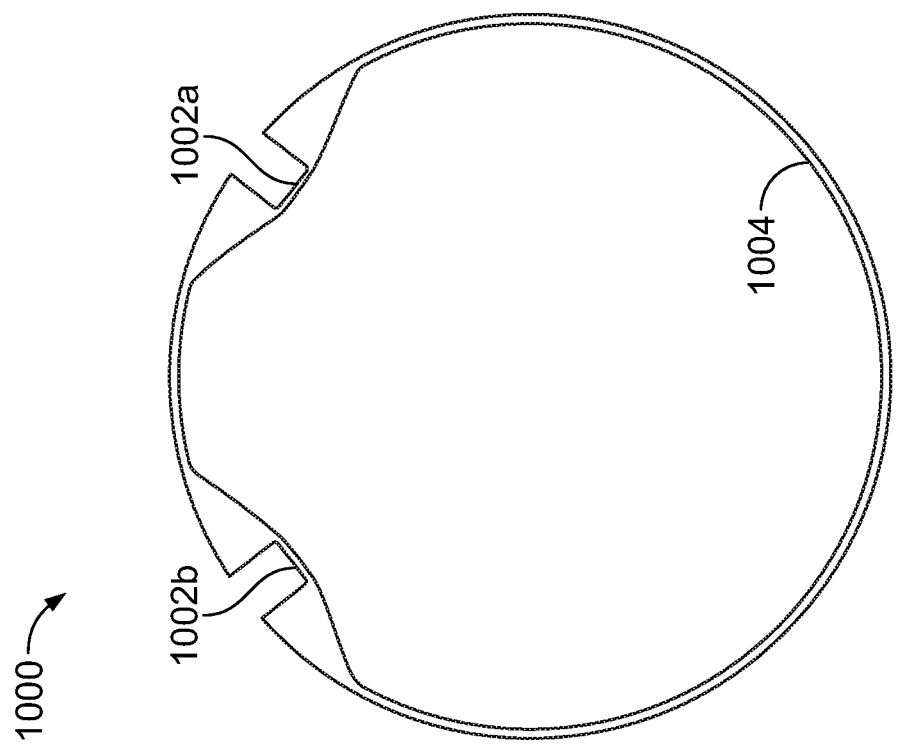

FIG. 10B is a cross-sectional view of the container 1000 of FIG. 10A showing the first and second openings 1002a, 1002b. The first and second openings 1002a, 1002b are bores formed in an outer surface of a body 1004 of the container 1000. The body 1004 supporting the first and second openings 1002a, 1002b is reinforced (e.g., has a greater thickness or greater amount of material).

FIG. 10C is a cross-sectional view of another example container 1001 disclosed herein including a first cover 1006 located in the first opening 1002a and a second cover 1008 (different than the first cover 1006) located in the second opening 1002b. The first cover 1006 and the second cover 1008 are movably coupled relative to the body 1004 of the container 1000. The first cover 1006 and the second cover 1008 are movable between an open position to receive a respective one of the first and second retainers 908 and 910 when the container 1001 is coupled to the container retention and release apparatus 900 and a closed position when the container 1001 is released from the container retention and release apparatus 900. In the closed position, an outer surface 1010 of each of the first cover 1006 and the second cover 1008 is flush relative to an outer surface 1012 of a body 1004a. To this end, the openings 1002a, 1002b does not affect an aerodynamic characteristic (e.g., performance) of the container 1001 when the container 1001 is released from the container retention and release apparatus 900.

The first cover 1006 of the illustrated example is biased toward the closed position via one or more biasing elements 1014 (e.g., a coil spring). The biasing elements 1014 are positioned between a first spring seat 1016 and a second spring seat 1018. The first spring seat 1016 of the illustrated example includes apertures or bores formed on an inner surface of the cover 1006 that receives a first end of the biasing elements 1014 and the second spring seat 1018 is a support plate to receive a second end of the biasing elements 1014. The cover 1008 of the illustrated example is biased toward the closed position via a biasing element 1020 (e.g., a coil spring). The biasing element 1020 is positioned between a first spring seat 1022 and a second spring seat 1024 (e.g., defined by a plate). The second cover 1008 includes a stem 1026 that extends through the second spring seat 1024. A fastener 1028 is coupled to an end of the stem and provides a stop when the cover 1008 moves to a closed position (e.g., as shown in FIG. 10B). When the second retainer 910 is inserted in the second opening 1002b, the second retainer 910 causes the second cover 1008 to move toward the second spring seat 1024, causing the fastener 1028 to move away from the second spring seat 1024. When the second retainer 910 is withdrawn from the second opening 1002b, the biasing element 1020 causes the cover 1008 to move away from the second spring seat 1024 until the fastener 1028 engages the second spring seat 1024. In some examples, the first and second openings 1002a, 1002b and/or the covers 1006, 1008 can be coated with a radar absorbent material to reduce detectability by radar.

Figure 11:
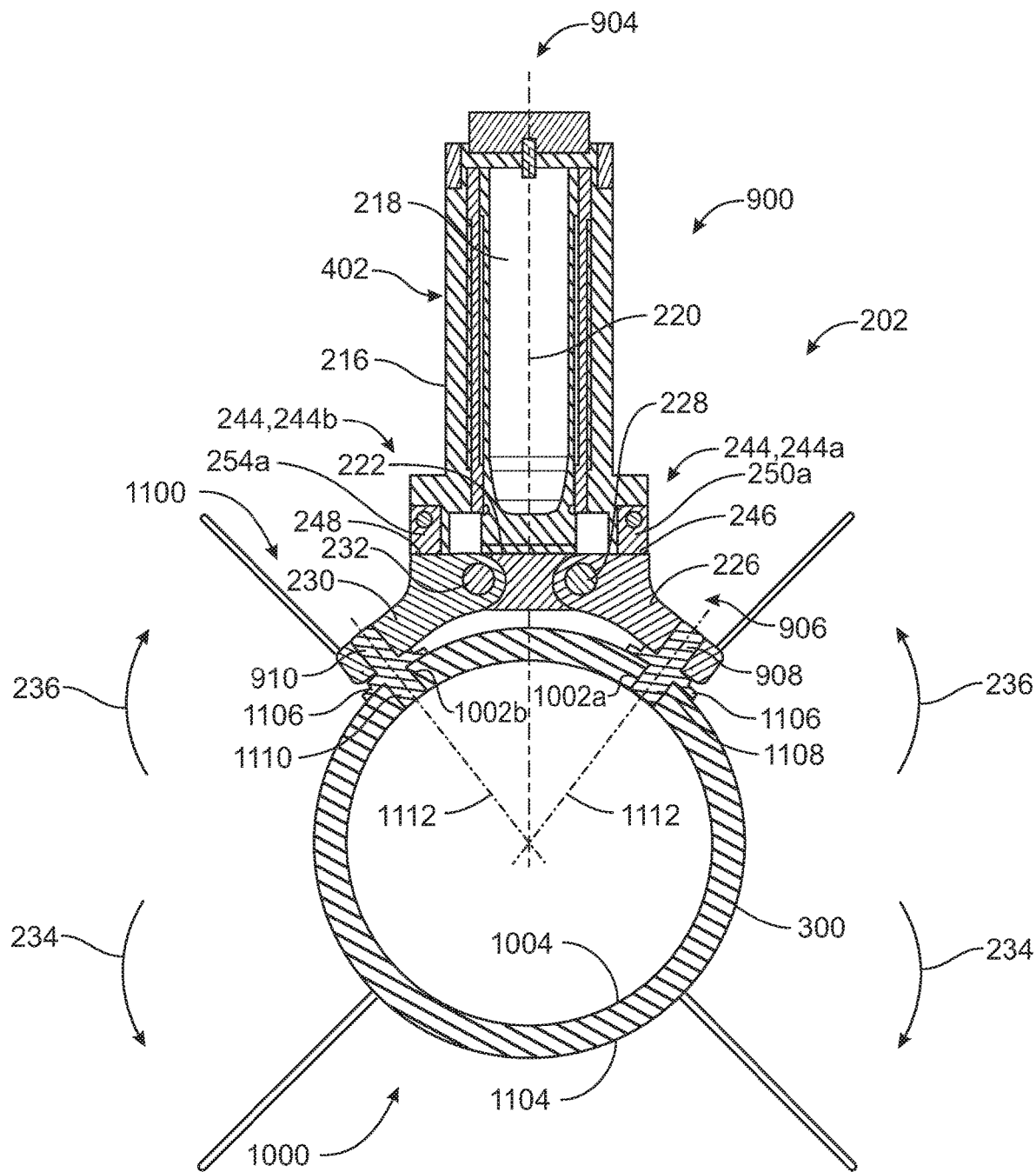
FIG. 11 is cross-sectional view of the example container retention and release apparatus of FIG. 9.

FIG. 11 is a cross-sectional view of the container retention and release apparatus 900 coupled to the container 1000. In the stored position 202, the piston 218 of the second ejector assembly 904 is in a first stroke position 602 (and the piston 218 of the first ejector assembly 206 is in the first stroke position 602). The swaybrace and retention assembly 906 is in a clamping position 1100 and provides a clamping or holding force to retain the container 1000. Specifically, the interaction between the first and second retainers 908, 910 relative to the container 1000 and the interaction between the lock 244 and the first and second arms 226, 230 generate the clamping and holding force provided by the swaybrace and retention assembly 906. For example, in the stored position 202, the first and second locks 244a, 244b are in engagement with the respective first and second surfaces 246, 248 of the first and second arms 226, 230 to prevent or restrict rotation of the first and second arms 226, 230 in the second direction 236. In turn, the first and second wedges 250a, 254a impart forces to the respective first and second arms 226, 230 in the first direction 234. Additionally, the first retainer 908 and the second retainer 910 are in engagement with an outer surface 1104 of the body 1004. Each of the first and second retainers 908, 910 includes a flange 1106 to engage (e.g., brace against) the outer surface 1104 of the container 1000. Additionally, a first pin 1108 of the first retainer 908 is engaged with (e.g., at least partially inserted in) the first opening 1002a and a second pin 1110 of the second retainer 910 is engaged with (e.g., at least partially inserted in) the second opening 1002b. To this end, engagement between the first lock 244a and the first surface 246 and the engagement between the flange 1106 of the first retainer 908 and the outer surface 1104 of the container 1000 prevents rotation of the first arm 226 about the first pivot 228 in the first direction 234 and the second direction 236. Likewise, engagement between the second lock 244b and the second surface 248 and the engagement between the flange 1106 of the second retainer 910 and the outer surface 1104 of the container 1000 prevents rotation of the second arm 230 about the second pivot 232 in the first direction 234 and the second direction 236. Each of the first pin 1108 and the second pin 1110 has a longitudinal axis 1112 that is angled or canted relative to the longitudinal axis 220 of the piston 218. For example, the longitudinal axes 1112 are at an angle of between approximately 25 degrees and 85 degrees relative to the longitudinal axis 220. Thus, the first arm 226 and the second arm 230 provide the clamping or holding force in a direction toward the body 1004 of the container 1000 (e.g., along the longitudinal axes 1112 of the respective first and second pins 1108, 1110). Further, engagement between the first retainer 908 (e.g., the first pin 1108) and the second retainer 910 (e.g., the second pin 1110) with the respective first and second openings 1002a, 1002b provides a bearing force to retain the container 1000 coupled to the swaybrace and retention assembly 906.

FIG. 12 is a perspective view of another example container retention and release apparatus 1200 disclosed herein. FIG. 12 illustrates the container retention and release apparatus 1200 in a deployed position 204. The container retention and release apparatus 1200 includes a first ejector assembly 1202, a second ejector assembly 1204, and an energy source 210. The first ejector assembly 1202 and the second ejector assembly 1204 of the illustrated example are substantially similar to the first ejector assembly 206 and the second ejector assembly 208 of FIGS. 2A and 2B. For example, each of the first ejector assembly 1202 and the second ejector assembly 1204 includes a cylinder 216, a piston 218, a lock 244, a latch 258, and a drive system 274.

However, the container retention and release apparatus 1200 includes a swaybrace and retention assembly 1206 that is different from the swaybrace and retention assembly 214 of the container retention and release apparatus 200. To pivotally couple the swaybrace and retention assembly 1206 to the piston 218, the container retention and release apparatus 1200 includes a mounting bracket 1208. The swaybrace and retention assembly 1206 of the illustrated example includes a swaybrace having a first arm 1210 and a second arm 1212 pivotally coupled to the mounting bracket 1208 about a pivot 1214 (e.g., a common pivot or a common axis). Although the first arm 1210 and the second arm 1212 are pivotally coupled about the pivot 1214 (e.g., a common pivot), the first arm 1210 is not fixed to the second arm 1212 in such a manner that pivotal movement of one of the first arm 1210 or the second arm 1212 does not cause (e.g., simultaneous) pivotal movement of the other one of the first arm 1210 or the second arm 1212. In some examples, the first arm 1210 and the second arm 1212 can pivot simultaneously or concurrently relative to the pivot 1214. The first arm 1210 includes a first end 1210a and a second end 1210b. The first end 1210a of the first arm 1210 has a first flange 1216 and a second flange 1218 spaced from the first flange 1216 (e.g., a yoke or clevis). The second arm 1212 includes a first end 1212a and a second end 1212b. The first end 1212a of the second arm 1212 is located or positioned between the first flange 1216 and the second flange 1218 when the first arm 1210 is coupled to the second arm 1212. For example, the first end 1210a of the first arm 1210 and the first end 1212a of the second arm 1212 form a yoke and rod end connection. A fastener 1220 (e.g., a pin) is received by respective openings of the mounting bracket 1208 and the first ends 1210a, 1212a of the first and second arms 1210, 1212 to define the pivot 1214 (e.g., to pivotally couple the first and second arms 1210, 1212 to the piston 218 via the mounting bracket 1208). To facilitate pivotal movement of the first and second arms 1210, 1212, the respective openings of the mounting bracket 1208 and/or opening of the first ends 1210a, 1212a of the first and second arms 1210, 1212 can include a bushing or a bearing. The second end 1210b of the first arm 1210 includes a first receptacle 240 to receive a post of a container and the second end 1212b of the second arm 1212 includes a second receptacle 242 to receive a post of a container. The container retention and release apparatus 1200 operates substantially similar to the container retention and release apparatus 200 of FIGS. 2A and 2B.

Figure 13A:
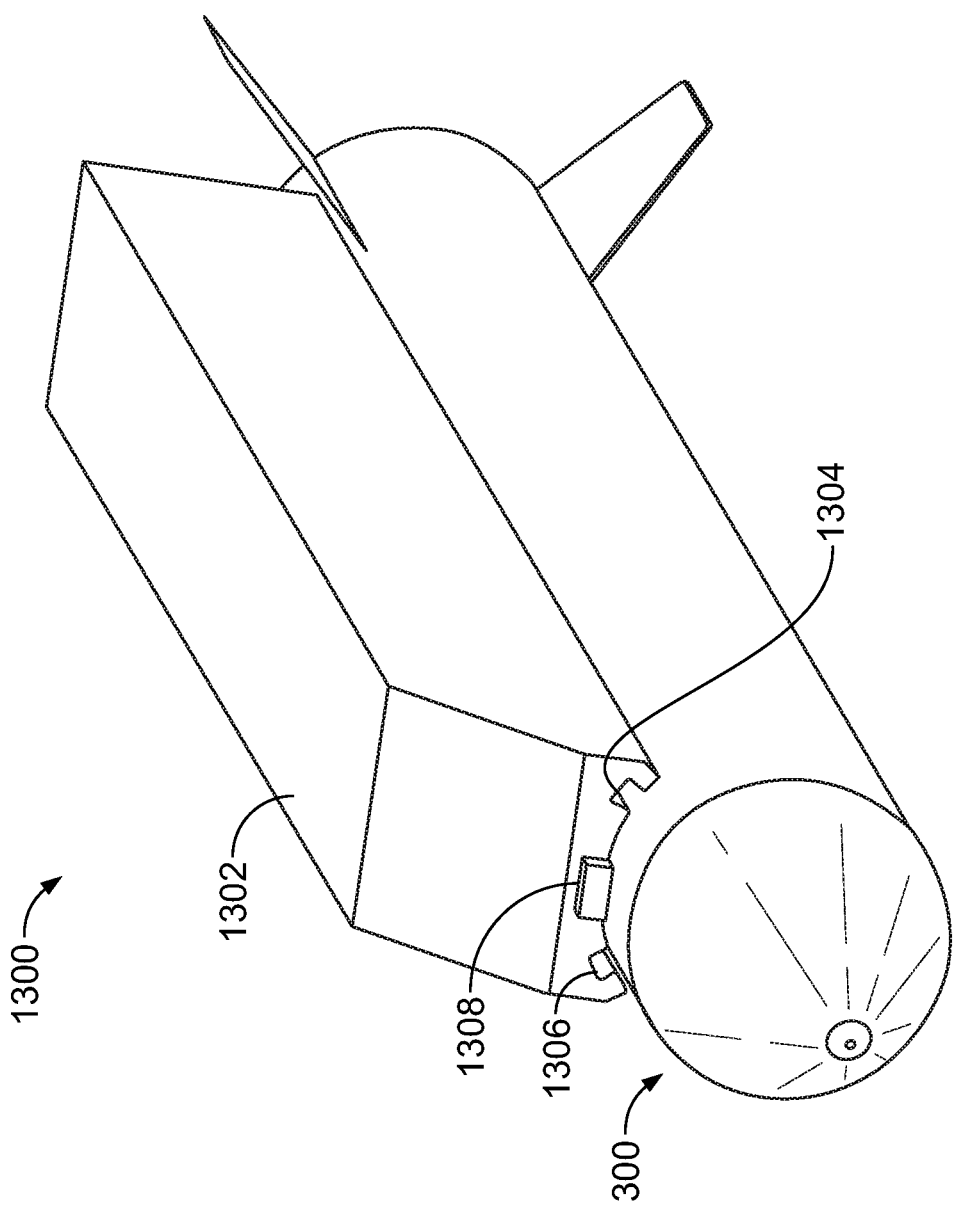
FIG. 13A is a perspective view of another example container retention and release apparatus disclosed herein.
Figure 13B:
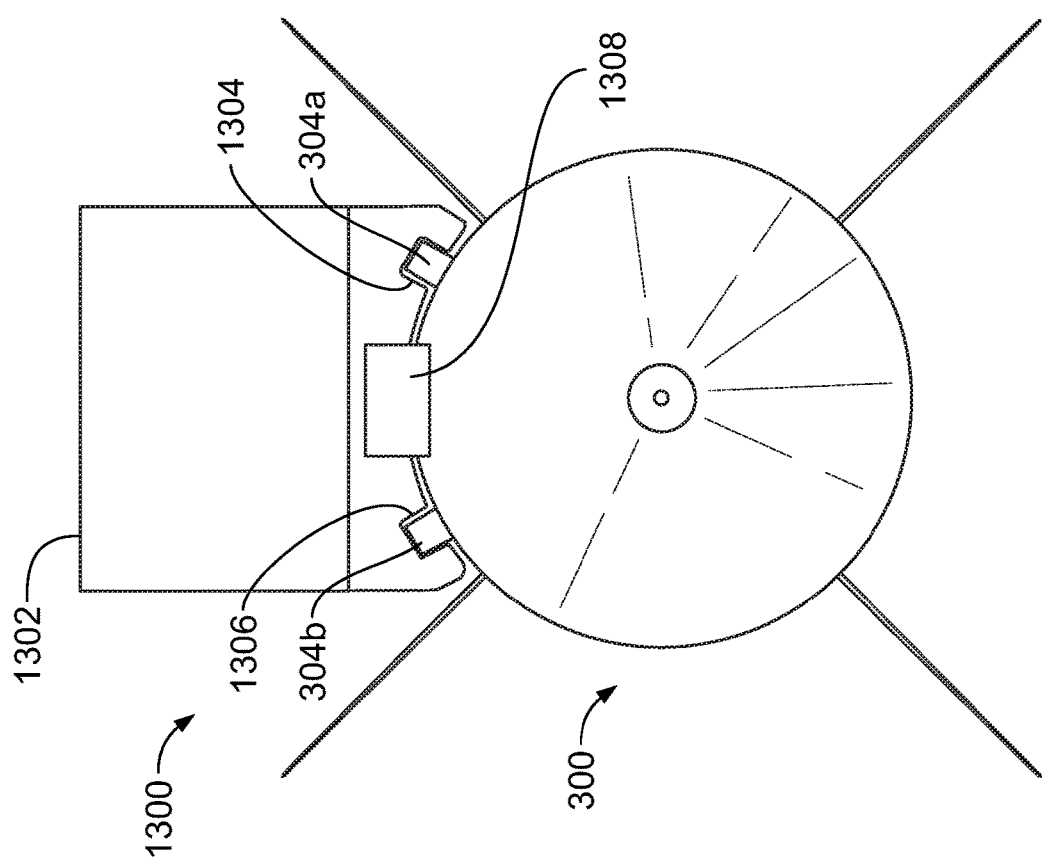
FIG. 13B is a front view of the example container retention and release apparatus of FIG. 13A.

FIG. 13A illustrates another example container retention and release apparatus 1300 disclosed herein. FIG. 13B is a front view of the example container retention and release apparatus 1300 of FIG. 13A. The container retention and release apparatus 1300 of the illustrated example is a rail launch and ejection apparatus 1302. The rail launch and ejection apparatus 1302 can be employed to launch the container 300 of FIG. 3A. The rail launch and ejection apparatus 1302 of the illustrated example includes a first channel 1304 and a second channel 1306. The first channel 1304 receives (e.g. slidably receives) the posts 304a, 304c of the container 300 and the second channel 1306 receives (e.g. slidably receives) the posts 304b, 304d of the container 300. The rail launch and ejection apparatus 1302 includes a lock 1308 to prevent movement of the container 300 when coupled to the rail launch and ejection apparatus 1302. In some examples, the rail launch and ejection apparatus 1302 can be employed to launch the example containers 400 and 401 of FIGS. 4A and 4B. To release (e.g., launch) the container 300, the lock 1308 is positioned to an open position and the container 300 moves relative to the rail launch and ejection apparatus 1302. For example, the posts 304a, 304c slide along the first channel 1304 until the second post 304c exits an end of the first channel 1304 and the posts 304b, 304c slide along the second channel 1306 until the post 304d exits an end of the second channel 1306.

Figure 14:
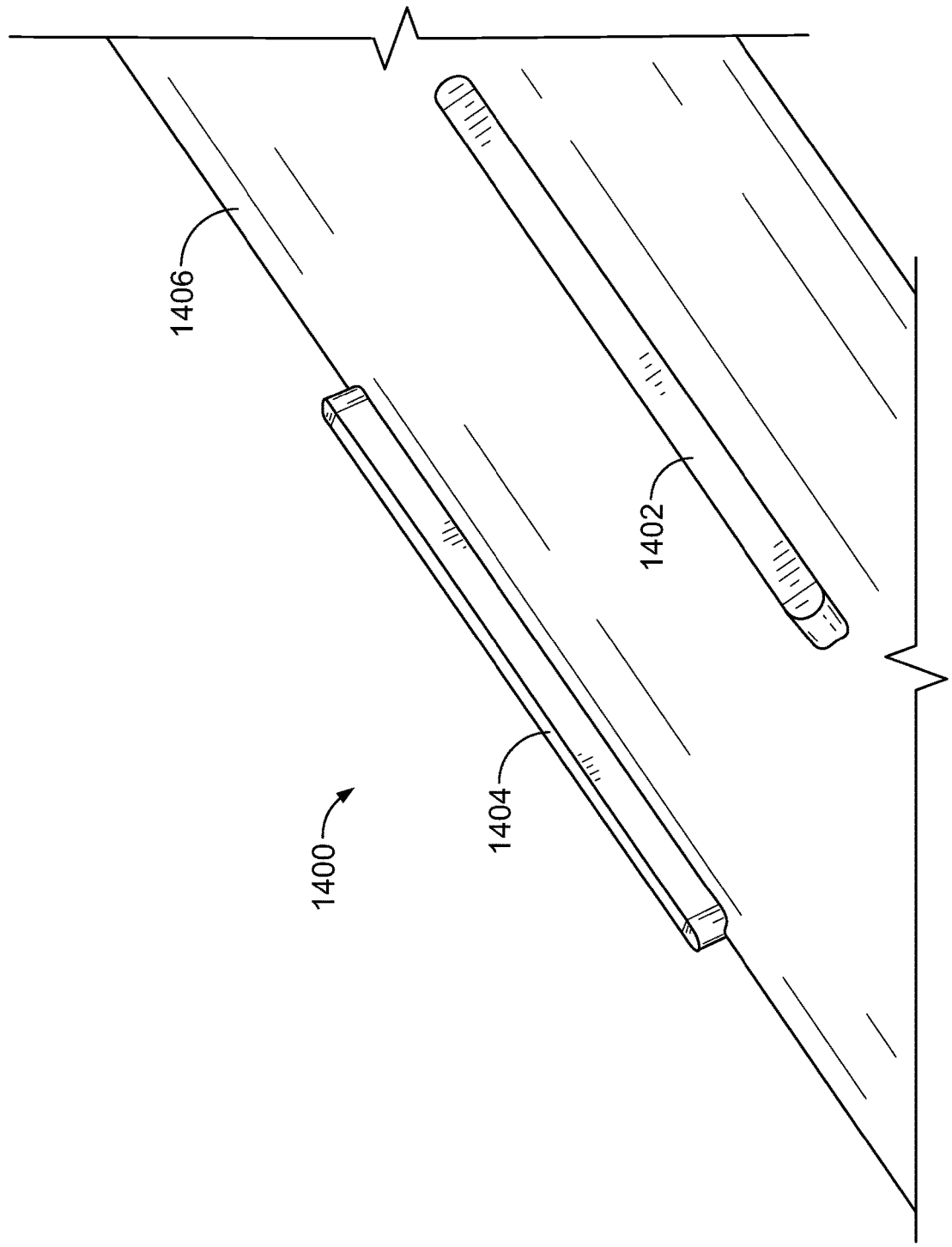
FIG. 14 is an enlarged, partial view of another example container disclosed herein that can be used with the example container retention and release apparatus of FIGS. 13A and 13B.

FIG. 14 illustrates another example container 1400 that can be launched by the container retention and release apparatus 1300 of FIGS. 13A and 13B. The container 1400 includes a first rail 1402 and a second rail 1404 formed on an outer surface 1406 of the container 1400. The first channel 1304 receives (e.g. slidably receives) the first rail 1402 and the second channel 1306 receives (e.g. slidably receives) the second rail 1404 to couple the container 1400 to the rail launch and ejection apparatus 1302.

Figure 15:
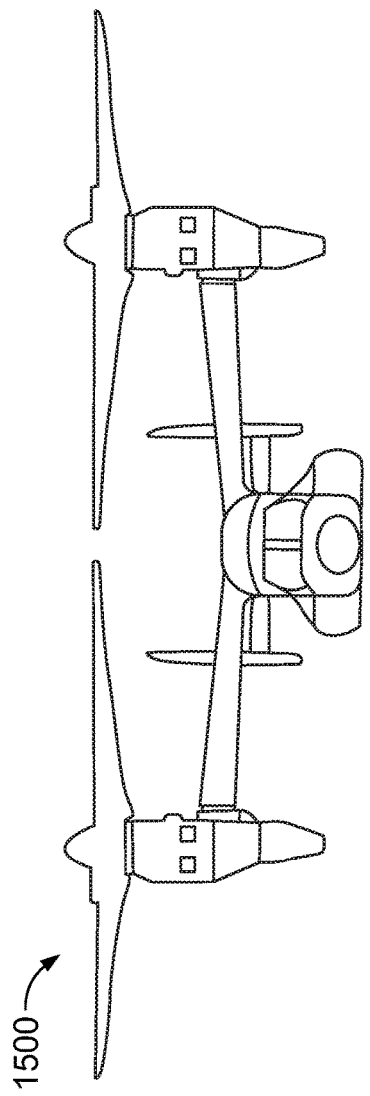
FIG. 15 is a front view of an example commercial aircraft that can be implemented with an example container retention and release apparatus disclosed herein.

FIG. 15 is another aircraft 1500 that can be implemented with the example container retention and release apparatus 200, 900, 1200 and 1300 disclosed herein. For example, the aircraft 1500 of FIG. 15 is a commercial aircraft that can be used to deliver pods and/or other cargo. In some examples, the aircraft 1500 of FIG. 15 can be an autonomous aircraft such as, for example, an unmanned aerial vehicle (i.e., a drone).

Figure 16:
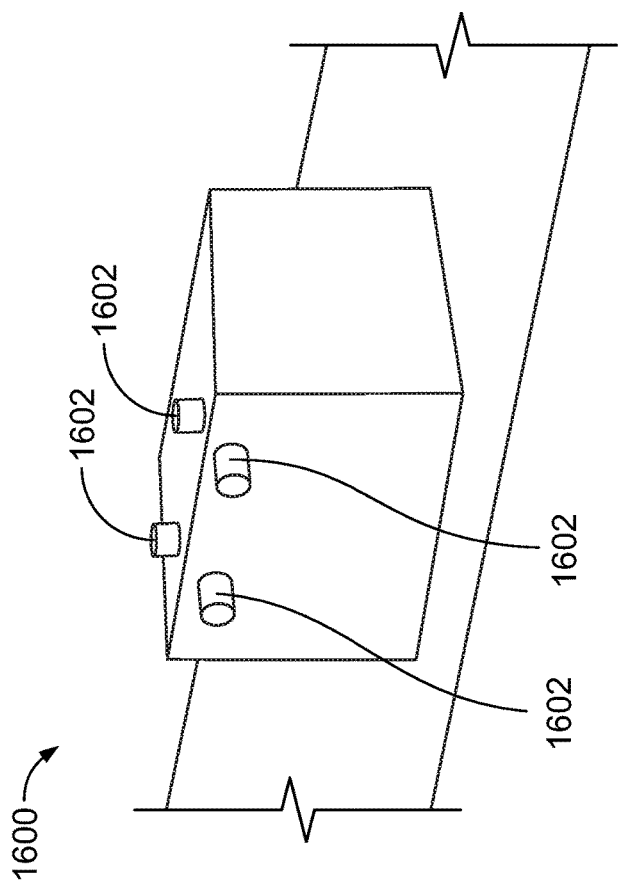
FIG. 16 is a perspective view of another example container for use with an example container retention and release apparatus disclosed herein.

FIG. 16 illustrates another container 1600 that may be carried, retained and/or released by the example container retention and release apparatus 200, 900, 1200 and 1300 disclosed herein. The container 1600 of the illustrated example includes a rectangular (e.g., a square) profile and includes posts 1602 to interface or couple with the first and second receptacles 240, 242. In some examples, the container 1600 can include one or more openings 1002a, 1002b and/or a combination of posts and openings.

Although each example container retention and release apparatus disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the first ejector assembly 206, 1202, the second ejector assembly 208, 904, 1204, and/or the rail launch and ejection apparatus 1302 provides means for retaining and/or releasing a container 300, 400, 401, 1000, 1400. In some examples, the piston 218 provides means for moving or ejecting a container from an aircraft. In some examples, the swaybrace and retention assembly 214, 906, 1206 provides means for clamping or holding a container. In some examples, the pivots 228, 232, 1214 (e.g., a fastener and/or equivalents thereof) provide means for pivotably coupling the first arm 226, 1210 and the second arm 230, 1212 to the piston 218. In some examples, the cylinder 216 provides means for defining a cavity 604. In some examples, the energy source 210 provides means for providing energy. In some examples, the first and second receptacles 240, 242 and/or the first and second retainers 908, 910 provide means for engaging or retaining a container. In some examples, the latch 258 provides means for latching the piston 218. In some examples, the drive system 274 provides means for actuating a latch 258 between a latched position 260 and an unlatched position 262. In some examples, the lock 244 provides means for preventing rotation of the swaybrace and retention assembly 214, 906, 1206 toward the second direction 236 or a release position 800. In some examples, the first wedge 250*a* and the second wedge 254*a* provide means for locking the swaybrace and retention assembly 214, 906, 1206.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve container aerodynamic drag performance or characteristics of a store, missile, container, etc. As a result, containers can have reduced weight, increased range, and/or increased payload.

At least some of the aforementioned examples include one or more features and/or benefits including, but not limited to, the following:

In some examples, a container retention and release apparatus that includes an actuator and a swaybrace and retention assembly pivotally coupled to the actuator. The swaybrace and retention assembly is to pivot relative to the actuator between a first position to retain a container and a second position to release the container. The swaybrace and retention assembly includes a swaybrace arm having a receptacle to engage a post of a container. The swaybrace arm to pivot between the first position to cause the receptacle to engage the post of the container to retain the container and the second position to cause the receptacle to disengage the post to release the container.

In some examples, the actuator includes a cylinder and a piston movably coupled to the cylinder between a first stroke position and a second stroke position, the container retention and release apparatus being in a stored position when the piston is at the first stroke position and a deployed position when the piston is at the second stroke position.

In some examples, the swaybrace arm is to maintain the receptacle in engagement with the post of the container when the piston moves between the first stroke position and the second stroke position.

In some examples, the swaybrace arm moves to the second position to cause the receptacle to disengage the post of the container when the piston is at the second stroke position.

In some examples, a latch is to prevent movement of the piston when the container retention and release apparatus is in the stored condition.

In some examples, a drive system is to move the latch between a latched position to prevent movement of the piston relative to the cylinder and an unlatched position to allow movement of the piston relative to the cylinder.

In some examples, a lock is to engage the swaybrace arm when the swaybrace arm is in the first position and the container retention and release apparatus is in the stored condition to prevent pivotal movement of the swaybrace arm in a direction away from the container.

In some examples, a container retention and release apparatus includes a first ejector assembly including: a first cylinder; a first piston movably coupled to the first cylinder; a first swaybrace coupled to a first end of the first piston, the first swaybrace having a first arm pivotally coupled relative to the first piston and a second arm pivotally coupled relative to the first piston, the first arm including at least one of a first receptacle to interface with a first post of a container or a first retainer to interface with a first opening of the container, and the second arm including at least one of a second receptacle to interface with a second post of the container or a second retainer to interface with a second opening of the container.

In some examples, the first arm and the second arm are to pivot about a common axis.

In some examples, the first arm is to pivot relative to a first pivot point and the second arm is to pivot relative to a second pivot point spaced from the first pivot point.

In some examples, the first arm is to pivot in a first direction to enable the at least one of the first receptacle to engage the first post of the container or the first retainer to engage the first opening of the container.

In some examples, the second arm is to pivot in the first direction to enable the at least one of the second receptacle to engage the second post of the container or the first retainer to engage the second opening of the container.

In some examples, the first arm is to pivot in a second direction opposite the first direction to enable the at least one of the first receptacle to disengage the first post of the container or the first retainer to disengage the first opening of the container.

In some examples, the second arm is to pivot in the second direction opposite the first direction to enable the at least one of the second receptacle to disengage the second post of the container or the second retainer to disengage the second opening of the container.

In some examples, a first lock coupled to a first side of the cylinder and a second lock coupled to a second side of the cylinder.

In some examples, the first lock is to engage the first arm to restrict rotation of the first arm in the second direction and the second lock is to engage the second arm to restrict rotation of the second arm in the second direction when the container retention and release apparatus is in a stored condition.

In some examples, the first cylinder assembly includes a first latch movable between a first position to prevent movement of the first piston relative to the first cylinder and a second position to allow movement of the first piston relative to the first cylinder.

In some examples, a second ejector assembly including: a second cylinder; a second piston movably coupled to the second cylinder; and a second swaybrace coupled to a first end of the second piston, The second swaybrace has a third arm pivotally coupled relative to the second piston and a fourth arm pivotally coupled relative to the second piston. The third arm including at least one of a third receptacle to interface with a third post of the container or a third retainer to interface with a third opening of the container, and the fourth arm including at least one of a fourth receptacle to interface with a fourth post of the container or a fourth retainer to interface with a fourth opening of the container.

In some examples, a method to improve retention and deployment of a container, the method including: moving an actuator between a first stroke position and a second stroke position; and releasing the container by pivoting a swaybrace relative to the container to remove at least one of a first receptacle from a post of a container or a first retainer pin from a first opening of the container.

In some examples, the method includes preventing rectilinear movement of the actuator and pivotal movement of the swaybrace when the container is in a stored position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A container retention and release apparatus comprising:
   an actuator; and
   a swaybrace and retention assembly pivotally coupled to the actuator, the swaybrace and retention assembly to pivot relative to the actuator between a first position to retain a container and a second position to release the container, the swaybrace and retention assembly includes a swaybrace arm having a receptacle to engage a post of a container, the swaybrace arm to pivot between the first position to cause the receptacle to engage the post of the container to retain the container, and the second position to cause the receptacle to disengage the post to release the container.

2. The apparatus of claim 1, wherein the actuator includes a cylinder and a piston movably coupled to the cylinder between a first stroke position and a second stroke position, the container retention and release apparatus being in a stored position when the piston is at the first stroke position and a deployed position when the piston is at the second stroke position.

3. The apparatus of claim 2, wherein the swaybrace arm is to maintain the receptacle in engagement with the post of the container when the piston moves between the first stroke position and the second stroke position.

4. The apparatus of claim 3, wherein the swaybrace arm moves to the second position to causes the receptacle to disengage the post of the container when the piston is at the second stroke position.

5. The apparatus of claim 2, further including a latch to prevent movement of the piston when the container retention and release apparatus is in the stored condition.

6. The apparatus of claim 5, further including a drive system to move the latch between a latched position to prevent movement of the piston relative to the cylinder and an unlatched position to allow movement of the piston relative to the cylinder.

7. The apparatus of claim 2, further including a lock to engage the swaybrace arm when the swaybrace arm is in the first position and the container retention and release apparatus is in the stored condition to prevent pivotal movement of the swaybrace arm in a direction away from the container.

8. A container retention and release apparatus comprising:
   a first ejector assembly including:
      a first cylinder;
      a first piston movably coupled to the first cylinder; and
      a first swaybrace coupled to a first end of the first piston, the first swaybrace having a first arm pivotally coupled relative to the first piston and a second arm pivotally coupled relative to the first piston, the first arm including at least one of a first receptacle to interface with a first post of a container or a first retainer to interface with a first opening of the container, and the second arm including at least one of a second receptacle to interface with a second post of the container or a second retainer to interface with a second opening of the container.

9. The apparatus of claim 8, wherein the first arm and the second arm are to pivot about a common axis.

10. The apparatus of claim 8, wherein the first arm is to pivot relative to a first pivot point and the second arm is to pivot relative to a second pivot point spaced from the first pivot point.

11. The apparatus of claim 8, wherein the first arm is to pivot in a first direction to enable the at least one of the first receptacle to engage the first post of the container or the first retainer to engage the first opening of the container.

12. The apparatus of claim 11, wherein the second arm is to pivot in the first direction to enable the at least one of the second receptacle to engage the second post of the container or the first retainer to engage the second opening of the container.

13. The apparatus of claim 11, wherein the first arm is to pivot in a second direction opposite the first direction to enable the at least one of the first receptacle to disengage the first post of the container or the first retainer to disengage the first opening of the container.

14. The apparatus of claim 13, wherein the second arm is to pivot in the second direction opposite the first direction to enable the at least one of the second receptacle to disengage the second post of the container or the second retainer to disengage the second opening of the container.

15. The apparatus of claim 13, further including a first lock coupled to a first side of the cylinder and a second lock coupled to a second side of the cylinder.

16. The apparatus of claim 15, wherein the first lock is to engage the first arm to restrict rotation of the first arm in the second direction and the second lock is to engage the second arm to restrict rotation of the second arm in the second direction when the container retention and release apparatus is in a stored condition.

17. The apparatus of claim 8, wherein the first cylinder assembly includes a first latch movable between a first position to prevent movement of the first piston relative to the first cylinder and a second position to allow movement of the first piston relative to the first cylinder.

18. The apparatus of claim 8, further including:
a second ejector assembly including:
a second cylinder;
a second piston movably coupled to the second cylinder; and
a second swaybrace coupled to a first end of the second piston, the second swaybrace having a third arm pivotally coupled relative to the second piston and a fourth arm pivotally coupled relative to the second piston, the third arm including at least one of a third receptacle to interface with a third post of the container or a third retainer to interface with a third opening of the container, and the fourth arm including at least one of a fourth receptacle to interface with a fourth post of the container or a fourth retainer to interface with a fourth opening of the container.

* * * * *